US010241721B2

(12) United States Patent
Nakazono et al.

(10) Patent No.: US 10,241,721 B2
(45) Date of Patent: Mar. 26, 2019

(54) IMAGE PROCESSING DEVICE AND IMAGE PROCESSING METHOD

(71) Applicant: OLYMPUS CORPORATION, Tokyo (JP)

(72) Inventors: Keisuke Nakazono, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/813,658

(22) Filed: Nov. 15, 2017

(65) Prior Publication Data

US 2018/0074752 A1    Mar. 15, 2018

Related U.S. Application Data

(63) Continuation of application No. PCT/JP2016/059952, filed on Mar. 28, 2016.

(30) Foreign Application Priority Data

Jun. 12, 2015   (JP) ................. 2015-119684

(51) Int. Cl.
*G06T 1/20*   (2006.01)
*G06T 1/60*   (2006.01)
(Continued)

(52) U.S. Cl.
CPC .......... *G06F 3/0656* (2013.01); *G06F 3/0613* (2013.01); *G06F 3/0683* (2013.01);
(Continued)

(58) Field of Classification Search
None
See application file for complete search history.

(56) References Cited

U.S. PATENT DOCUMENTS 6,145,024 A * 11/2000 Maezawa .............. G06F 13/122
                                                    385/24
7,743,183 B2 * 6/2010 Virdi ................. H04L 29/06027
                                                    365/189.05
(Continued)

FOREIGN PATENT DOCUMENTS

JP      5-181817 A      7/1993
JP      7-302201 A     11/1995
(Continued)

OTHER PUBLICATIONS

International Search Report dated Apr. 26, 2016, issued in counterpart International Application No. PCT/JP2016/059952 (2 pages).

*Primary Examiner* — Elias Mamo
(74) *Attorney, Agent, or Firm* — Westerman, Hattori, Daniels & Adrian, LLP

(57) ABSTRACT

There is provided an image processing device include an image processing section including a pipeline in which a plurality of processing modules is connected in series, each processing modules being configured to perform a predetermined process on input data, and the image processing section performing pipeline processing by the processing modules sequentially performing the process. Each of the processing modules includes a data buffer configured to temporarily store the data in unit of processing, and a control section configured to determine whether or not to store the data in the data buffer on the basis of a state of a data flow in the pipeline processing and a state of the data stored in the data buffer, and to select a path within the processing module by which the data is transferred on the basis of a determination result, and to control an operation of the data buffer.

8 Claims, 11 Drawing Sheets

(51) Int. Cl.
*G06F 3/06* (2006.01)
*G06F 13/38* (2006.01)

(52) U.S. Cl.
CPC ............... *G06F 13/38* (2013.01); *G06T 1/20* (2013.01); *G06T 1/60* (2013.01); *Y02D 10/14* (2018.01); *Y02D 10/151* (2018.01)

(56) References Cited

U.S. PATENT DOCUMENTS

| | | | | |
|---|---|---|---|---|
| 7,787,026 | B1* | 8/2010 | Flory | H04N 1/2166 348/231.99 |
| 9,462,032 | B2* | 10/2016 | Lieber | H04L 65/608 |
| 2003/0007703 | A1* | 1/2003 | Roylance | G06T 1/20 382/303 |
| 2005/0248584 | A1* | 11/2005 | Takeo | G06F 13/4027 345/603 |
| 2010/0328690 | A1 | 12/2010 | Yamada et al. | |
| 2012/0110224 | A1 | 5/2012 | Tanaka et al. | |

FOREIGN PATENT DOCUMENTS

| | | |
|---|---|---|
| JP | 10-334225 A | 12/1998 |
| JP | 2011-28738 A | 2/2011 |
| JP | 2012-98883 A | 5/2012 |

* cited by examiner

IMAGE PROCESSING DEVICE AND IMAGE PROCESSING METHOD

This application is a continuation application based on a PCT Patent Application No. PCT/JP2016/059952, filed on Mar. 28, 2016, whose priority is claimed on Japanese Patent Application No. 2015-119684, filed Jun. 12, 2015, the content of which are incorporated herein by reference.

TECHNICAL FIELD

The present invention relates to an image processing device and an image processing method.

BACKGROUND ART

In many image processing devices such as a system LSI mounted on an imaging device such as a still image camera, a moving image camera, a medical endoscope camera, or an industrial endoscope camera, one connected dynamic random access memory (DRAM) is shared by a plurality of built-in processing blocks. In such a system LSI, the plurality of built-in processing blocks are connected to a data bus inside the system LSI, and each processing block accesses the DRAM in direct memory access (DMA).

Also, there are processing blocks that include a plurality of processing modules and perform pipeline processing by the processing modules being connected in series among the processing blocks provided in such a system LSI. For example, in a system LSI provided in an imaging device, an image processing section that performs image processing is a processing block that performs pipeline processing. In addition, the image processing section implements high-speed image processing in the image processing section according to pipeline processing in which a plurality of image processing modules that perform image processing are connected in series. Generally, a data buffer which delivers data between the processing modules is provided in a processing block having a plurality of processing modules configured to perform the pipeline processing, a delay of processing in each processing module is absorbed by the data buffer and the pipeline processing can be performed normally.

For example, Japanese Unexamined Patent Application, First Publication No. H10-334225 discloses technology of an image processing device having a pipeline configuration in which a double buffer, which is a data buffer, is provided between processing stages which are processing modules. In the image processing device disclosed in Japanese Unexamined Patent Application, First Publication No. H10-334225, the pipeline processing in which processing by each processing stages is sequentially performed, by delivering data between the processing stages via the double buffer is implemented.

In the image processing device disclosed in Japanese Unexamined Patent Application, First Publication No. H10-334225, data processed by a previous processing stage is temporarily stored in the double buffer and the data stored in the double buffer is read by a subsequent processing stage, so that the data is delivered from the previous processing stage to the subsequent processing stage. That is, in the image processing device disclosed in Japanese Unexamined Patent Application, First Publication No. H10-334225, when data is delivered from the previous processing stage to the subsequent processing stage, writing of data to the double buffer by the previous processing stage and reading of data from the double buffer by the subsequent processing stage are necessarily performed.

SUMMARY OF INVENTION

Solution to Problem

According to a first aspect of the present invention, an image processing device is an image processing device includes a memory and an image processing section, the memory and the image processing section being connected to a data bus, the image processing section including a pipeline in which a plurality of processing modules is connected in series, each processing modules being configured to perform a predetermined process on input data, and the image processing section performing pipeline processing by the processing modules sequentially performing the process, wherein each of the processing modules includes: a data buffer configured to temporarily store the data in unit of processing; and a control section configured to determine whether or not to store the data in the data buffer on the basis of a state of a data flow in the pipeline processing and a state of the data stored in the data buffer, and to select a path within the processing module by which the data is transferred on the basis of a determination result, and to control an operation of the data buffer.

According to a second aspect of the present invention, in the image processing device of the above-described first aspect, the control section may select a path for reading and transferring the data after the data is temporarily stored in the data buffer and cause the data buffer to operate if the data is able to be further stored in the data buffer in a state in which the data is stored in a storage capacity of the data buffer, the control section may select a path for reading and transferring the data after the data is temporarily stored in the data buffer and cause the data buffer to operate so that the stored data is held if the data is unable to be further stored in the data buffer in a state in which the data flow in the pipeline processing is delayed, and the control section may select a path along which the data is transferred by bypassing the data buffer without being stored in the data buffer and cause an operation of the data buffer to stop if the data is not stored in all the storage capacity of the data buffer in a state in which the data flow in the pipeline processing is not delayed.

According to a third aspect of the present invention, in the image processing device of the above-described second aspect, the control section may output a state notification signal indicating an operation state of the processing module provided with the control section itself to the processing module of a previous stage in the configuration of the pipeline, and the control section may determine a state of the data flow in the pipeline processing on the basis of the state notification signal input from the processing module of a subsequent stage in the configuration of the pipeline.

According to a fourth aspect of the present invention, in the image processing device of the above-described third aspect, the control section may determine the state of the data flow in the pipeline processing on the basis of the state notification signals input from a plurality of the processing modules of the subsequent stages in the configuration of the pipeline.

According to a fifth aspect of the present invention, in the image processing device of the above-described third aspect, the state notification signal may be a signal indicating whether or not it is possible to receive the data on which the processing module of the previous stage has performed the process, the state notification signal may include a data request signal for requesting an output of the data on which the processing module of the previous stage has performed the process, and the control section may determine that the data flow in the pipeline processing is not delayed if the data request signal for requesting an output of the data from the processing module of the subsequent stage is input.

According to a sixth aspect of the present invention, in the image processing device of the above-described fifth aspect, the control section may output the data request signal for requesting the output of the data to the processing module of the previous stage if the data is able to be stored in the data buffer.

According to a seventh aspect of the present invention, in the image processing device of the above-described fifth aspect, the control section may defers an output of the data request signal for requesting the output of the data to the processing module of the previous stage until a state in which the data is not stored in all the storage capacity of the data buffer is reached, and after the state in which the data is not stored in all the storage capacities of the data buffer is reached, the control section may output the data request signal to the processing module of the previous stage, select the path along which the data is transferred by bypassing the data buffer, and cause the operation of the data buffer to stop.

According to an eighth aspect of the present invention, in the image processing device of the above-described second aspect, the image processing section may further include a bus traffic monitoring section configured to monitor bus traffic in the data bus by monitoring access of a plurality of bus masters connected to the data bus to the memory, the bus traffic monitoring section may output a buffer through instruction signal indicating selection of a path along which the data is transferred by bypassing the data buffer to each processing module if it is determined that the amount of data flowing through the data bus is small on the basis of the monitored bus traffic, and the control section within each processing module may determine that the data flow in the pipeline processing is not in a delayed state if the buffer through instruction signal is input.

According to a ninth aspect of the present invention, in the image processing device of the above-described second aspect, the processing module may further include a selector configured to select either one of the path along which the data read from the data buffer is transferred and the path along which the data is transferred by bypassing the data buffer as the path along which the data is transferred, the control section may include a data amount management section configured to manage the amount of data stored in the data buffer and output data amount information indicating the monitored amount of data; a buffer through determination section configured to determine an operation to be performed in the data buffer on the basis of the data amount information and the state of the data flow in the pipeline processing and output an instruction signal instructing the data buffer to write the data and read the data from the data buffer and a control signal for selecting the path along which the data is transferred on the basis of a determination result; a buffer writing management section configured to generate a buffer writing signal which is a control signal for controlling writing of the data to the data buffer in accordance with the instruction signal for writing the data to the data buffer; and a buffer reading management section configured to generate a buffer reading signal which is a control signal for controlling reading of the data from the data buffer in accordance with the instruction signal for reading the data from the data buffer, the data amount management section may manage the amount of data on the basis of the number of input data and the buffer reading signal, the buffer through determination section may outputs the instruction signal for issuing an instruction for performing the writing of the data to the data buffer and the reading of the data from the data buffer, and the control signal for selecting a path for reading and transferring the data after being the data is temporarily stored in the data buffer if the data amount information indicates that the amount of data is a value greater than 0, the buffer through determination section may output the instruction signal for issuing an instruction for stopping the writing of the data to the data buffer and the reading of the data from the data buffer, and the control signal for selecting a path along which the data is transferred by bypassing the data buffer if the data amount information indicates that the amount of data is 0, and the selector may select a path according to the control signal as the path along which the data is transferred.

According to a tenth aspect of the present invention, an image processing method is an image processing method in an image processing device includes a memory and an image processing section, the memory and the image processing section being connected to a data bus, the image processing section including a pipeline in which a plurality of processing modules is connected in series, each processing modules being configured to perform a predetermined process on input data, and the image processing section performing pipeline processing by the processing modules sequentially performing the process, the image processing method including: a control step, by each of the processing modules, determining whether or not to store the data in the data buffer on the basis of a state of a data flow in the pipeline processing and a state of the data stored in a data buffer temporarily storing the data in unit of processing, and selecting a path within the processing module by which the data is transferred on the basis of a determination result, and to controlling an operation of the data buffer.

DESCRIPTION OF EMBODIMENTS

First Embodiment

Figure 1:
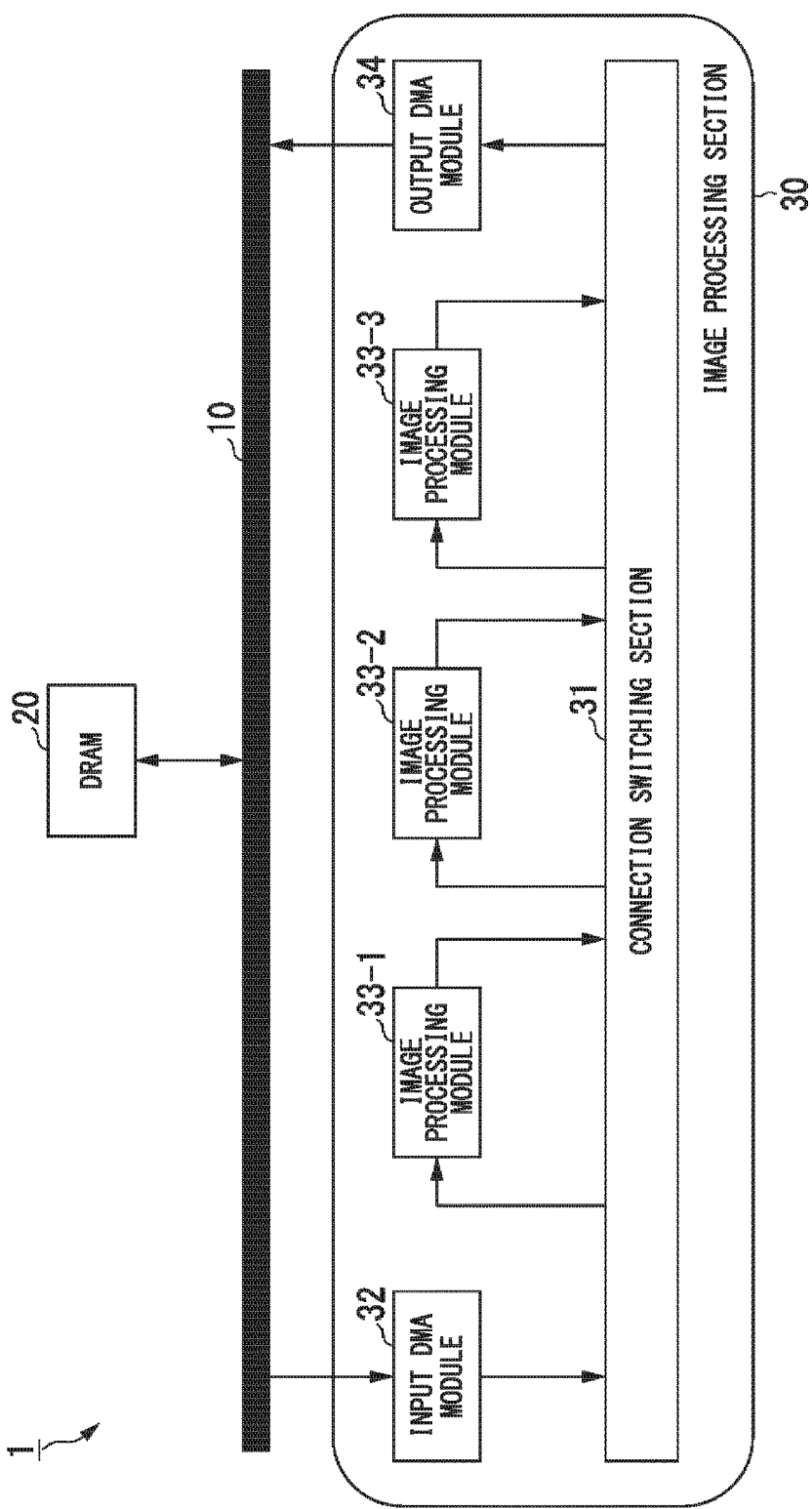
FIG. 1 is a block diagram showing a schematic configuration of an image processing device in a first embodiment of the present invention.

Hereinafter, an embodiment of the present invention is described with reference to the drawings. FIG. 1 is a block diagram showing a schematic configuration of an image processing device in the first embodiment of the present invention. The image processing device 1 shown in FIG. 1 includes a DMA bus 10, a DRAM 20, and an image processing section 30. Further, the image processing section 30 includes a connection switching section 31, an input DMA module 32, three image processing modules 33-1 to 33-3, and an output DMA module 34. The image processing device 1 is provided in an imaging device such as, for example, a still image camera.

In FIG. 1, the illustration of other component elements provided in the image processing device 1 and connected to the DMA bus 10 is omitted. For example, other component elements included in the image processing device 1 are an imaging processing section for controlling a solid-state imaging device that photoelectrically converts an optical image of a subject formed by a lens provided in the imaging device, a recording processing section for performing a recording process of recording data of an image processed by the image processing section 30, and a display processing section for displaying the data of the image processed by the image processing section 30 on a display unit provided in the image processing device 1. Also, for example, other component elements provided in the image processing device 1 also are a system control section for controlling the component elements provided in the image processing device 1, and the like.

The DRAM 20 is connected to the DMA bus 10 and stores various data to be processed in the imaging device. For example, the DRAM 20 stores data of a still image output from a solid-state imaging device (not shown) provided in the imaging device. In the image processing device 1, data of a still image of one frame stored in the DRAM 20 is divided into a plurality of predetermined small blocks, and the image processing section 30 performs image processing for each block.

As shown in FIG. 1, the image processing section 30 sequentially performs image processing in the image processing device 1 according to pipeline processing in which the input DMA module 32, the image processing module 33-1, the image processing module 33-2, the image processing module 33-3, and the output DMA module 34 are connected together in series. In the following description, data included in each block obtained by dividing data of a still image of one frame is referred to as "block image data". The image processing section 30 reads data of each pixel (hereinafter referred to as "pixel data") included in the block image data, for example, from the DRAM 20 for every predetermined number of columns, and performs image processing using the read pixel data as a one unit of processing. In the following description, a plurality of pieces of consecutive pixel data included in the same column in pixel data of one unit of processing in which the image processing section 30 performs the image processing is referred to as a "unit line".

The image processing section 30 has a function of selecting image processing to be performed on data of a still image of one frame. More specifically, the image processing section 30 can sequentially perform image processing by each of the image processing module 33-1, the image processing module 33-2, and the image processing module 33-3, and can perform image processing by one or more of the image processing modules 33-1 to 33-3, or perform image processing by changing the order of the image processing modules 33-1 to 33-3. In the following description, each of the image processing module 33-1 to the image processing module 33-3 is referred to as an "image processing module 33" when each of the image processing modules 33-1 to 33-3 is indicated without distinguishing.

The connection switching section 31 switches an output destination of the image data output by each of the component elements provided in the image processing section 30, that is, switches a connection between the component elements provided in the image processing section 30. For example, if the image processing section 30 performs image processing of only the image processing module 33-2, a connection of each component element is switched so that an output terminal of the input DMA module 32 and an input terminal of the image processing module 33-2 are connected, and an output terminal of the image processing module 33-2 and an input terminal of the output DMA module 34 are connected. Also, for example, if image processing is performed by the image processing section 30 in the order of the image processing module 33-3 and the image processing module 33-1, a connection of each component element is switched so that the output terminal of the input DMA module 32 and an input terminal of the image processing module 33-3 are connected, an output terminal of the image processing module 33-3 and an input terminal of the image processing module 33-1 are connected, and an output terminal of the image processing module 33-1 and an input terminal of the output DMA module 34 are connected. Also, the connection switching section 31 switches between connections of the component elements provided in the image processing section 30, for example, in accordance with control from the system control section (not shown) provided in the image processing device 1.

The input DMA module 32 is a processing module for reading pixel data included in the block image data stored in the DRAM 20 for each unit line, and outputting the read pixel data to any image processing module 33 which is a processing module for performing image processing the next time via the connection switching section 31. For example, the input DMA module 32 reads pixel data from the DRAM 20 via the DMA bus 10 in accordance with control from the system control section (not shown) provided in the image processing device 1, and outputs the read pixel data to the image processing module 33 of a connection destination to which a connection is switched by the connection switching section 31.

The input DMA module 32 includes a data buffer capable of temporarily storing pixel data for a predetermined number of unit lines. Thus, the input DMA module 32 can temporarily store the pixel data read from the DRAM 20 via the DMA bus 10 in the data buffer, and output the pixel data temporarily stored in the data buffer to the image processing module 33 of a connection destination to which a connection is switched by the connection switching section 31.

Each of the image processing modules 33-1 to 33-3 is a processing module for performing various predetermined digital image processing on the pixel data input from the input DMA module 32 or the image processing module 33 of a connection destination to which a connection is switched by the connection switching section 31 via the connection switching section 31. The image processing performed by each of the image processing modules 33-1 to 33-3 includes, for example, YC processing for generating a Y (luminance) signal and a C (color) signal corresponding to each the pixel data, noise reduction processing for reducing noise included in each the pixel data, distortion correction processing for correcting magnification chromatic aberration and the like in an image represented by each the pixel data, and the like. Each of the image processing modules 33-1 to 33-3, for example, performs image processing on the pixel data input via the connection switching section 31 in accordance with control from the system control section (not shown) provided in the image processing device 1, and outputs the pixel data subjected to the image processing to the image processing module 33 or the output DMA module 34 of a connection destination to which a connection is switched by the connection switching section 31.

Also, each of the image processing modules 33-1 to 33-3 is also provided with a data buffer capable of temporarily storing pixel data of a predetermined number of unit lines. However, each of the image processing modules 33-1 to 33-3 controls whether or not to temporarily store the pixel data input via the connection switching section 31 in the data buffer on the basis of the flow of the pixel data in the pipeline processing.

In the following description, pixel data subjected to image processing is referred to as "processed pixel data" when the pixel data subjected to image processing is described in distinction from pixel data to be subjected to image processing stored in the DRAM 20.

The output DMA module 34 is a processing module for writing (storing) the processed pixel data input via the connection switching section 31 from the image processing module 33 of a connection destination to which a connection is switched by the connection switching section 31 to the DRAM 20. For example, the output DMA module 34 outputs the processed pixel data input via the connection switching section 31 to the DRAM 20 via the DMA bus 10 in accordance with control from the system control section (not shown) provided in the image processing device 1.

The output DMA module 34 also includes a data buffer capable of temporarily storing the processed pixel data for a predetermined number of unit lines. Thus, the output DMA module 34 can temporarily store the processed pixel data input via the connection switching section 31 in the data buffer and output the processed pixel data temporarily stored in the data buffer to the DRAM 20 via the DMA bus 10.

In this manner, in the image processing section 30, each processing module divides data of a still image of one frame into block image data and performs a series of image processing on each the block image data, for example, by sequentially performing image processing according to control from the system control section (not shown) provided in the image processing device 1 on image data included in each the block image data for each unit line.

Next, a configuration and operation of each processing module provided in the image processing section 30 will be described. First, a method of delivering pixel data between processing modules provided in the image processing section 30 will be described.

Figure 2:
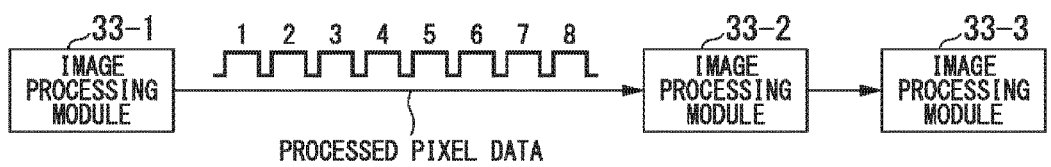
FIG. 2 is a diagram showing an example of a method of data transfer between image processing modules in an image processing section provided in the image processing device of the first embodiment of the present invention.

FIG. 2 is a diagram showing an example of a method of data transfer between the image processing modules 33 in the image processing section 30 provided in the image processing device 1 of the first embodiment of the present invention. In FIG. 2, an example in which the processed pixel data on which the image processing module 33-1 has performed image processing is output to the image processing module 33-2 is shown. As described above, in the image processing section 30, the pixel data output from each processing module is output to the processing module that performs the next processing via the connection switching section 31. However, in FIG. 2, illustration of the connection switching section 31 is omitted, and the processed pixel data is shown to be directly output from the image processing module 33-1 to the image processing module 33-2.

As described above, in the image processing section 30, each processing module performs image processing using a plurality of unit lines as one unit of processing. Thus, in the image processing section 30, the delivery of the pixel data between the processing modules provided in the image processing section 30 is also performed for each one unit of processing. In FIG. 2, a case in which the image processing module 33-1 of the previous stage outputs the processed pixel data of each of eight unit lines as one unit of processing to the image processing module 33-2 of the subsequent stage is shown. Also, one unit line includes a plurality of pieces of consecutive the processed pixel data included in the same column subjected to image processing.

In FIG. 2, although an example of a method of delivering (transferring) the processed pixel data between the image processing module 33-1 and the image processing module 33-2 is shown, a method of delivering pixel data between the input DMA module 32 and the image processing module 33 and a method of delivering the processed pixel data between the image processing module 33 and the output DMA module 34 are also similar to that of FIG. 2. Also, in FIG. 2, although an example in which the processed pixel data of each of the eight unit lines is delivered as one unit of processing is shown, the number of unit lines for performing delivery between processing modules is not limited to the number shown in FIG. 2, that is, 8.

(First Configuration)

Figure 3:
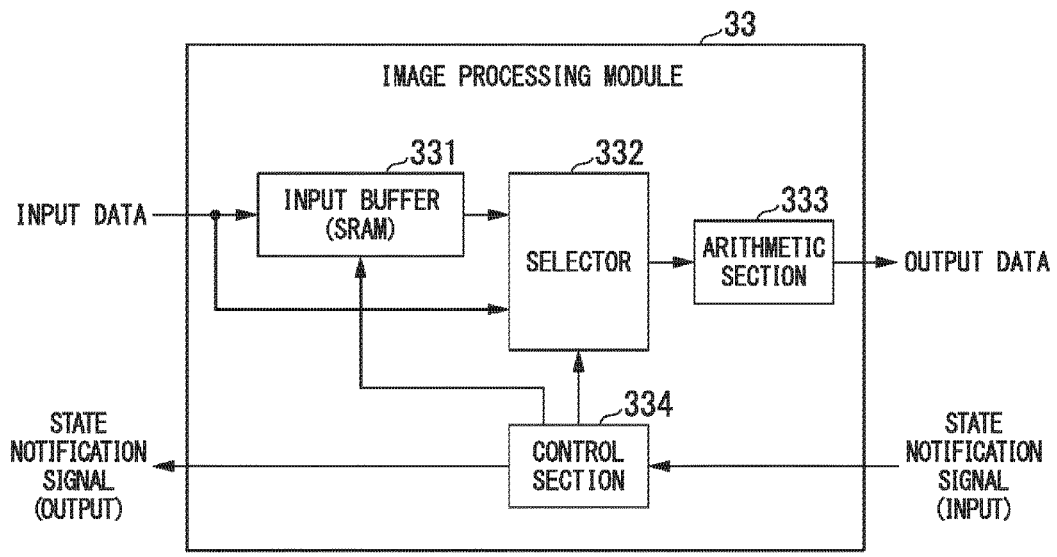
FIG. 3 is a block diagram showing a schematic configuration of the image processing module in the image processing section provided in the image processing device of the first embodiment of the present invention.

Next, the first configuration of each processing module provided in the image processing section 30 will be described. FIG. 3 is a block diagram showing a schematic configuration of the image processing module 33 in the image processing section 30 provided in the image processing device 1 of the first embodiment of the present invention. In FIG. 3, a basic configuration of the image processing module 33 of the first configuration is shown. The image processing module 33 of the first configuration shown in FIG. 3 includes an input buffer 331, a selector 332, an arithmetic section 333, and a control section 334.

The input buffer 331 is a data buffer that temporarily stores the input data input to the image processing module 33. The input buffer 331 is constituted of, for example, a memory such as a static random access memory (SRAM). The input buffer 331 has a storage capacity capable of enabling pixel data of a predetermined number of unit lines input from the processing module of the previous stage to be stored as input data. The input buffer 331 temporarily stores the input data, which has been input, in accordance with a control signal input from the control section 334.

Also, the input buffer 331 may be constituted of a so-called double buffer which includes two storage capacity sets for storing pixel data (input data) for a predetermined number of unit lines and operates so that an input and an output of pixel data of one unit of processing can be simultaneously performed by alternately performing writing of pixel data to one storage capacity set and reading of pixel data from the other storage capacity set.

The selector 332 is a selection unit that selects pixel data to be output to the arithmetic section 333. The selector 332 outputs either the input data (pixel data) temporarily stored in the input buffer 331 or the input data (pixel data) currently input to the image processing module 33 to the arithmetic section 333 in accordance with a control signal input from the control section 334. That is, the selector 332 outputs either the pixel data input from the processing module of the previous stage and temporarily stored in the input buffer 331 or the intact pixel data currently input from the processing module of the previous stage to the arithmetic section 333.

The arithmetic section 333 performs an arithmetic operation of various predetermined digital image processing on the input pixel data. The arithmetic section 333 outputs the processed pixel data generated by performing the arithmetic operation of image processing as output data outside the image processing module 33. That is, the arithmetic section 333 outputs the generated the processed pixel data to another image processing module 33 or the output DMA module 34 via the connection switching section 31.

The control section 334 provides a notification of an operation state of the image processing module 33 and controls each component element provided in the image processing module 33. The control section 334 outputs a state notification signal indicating the operation state of the image processing module 33 to the processing module of the previous stage. Also, the control section 334 controls the operation of the input buffer 331 according to whether or not there is free storage capacity in the input buffer 331.

More specifically, if there is free storage capacity in the input buffer 331, the input buffer 331 can temporarily store input data input to the image processing module 33. In this case, the control section 334 outputs a signal for requesting the output of the pixel data to the processing module of the previous stage as a state notification signal indicating a state in which it is possible to receive the input data from the processing module of the previous stage. Then, the control section 334 controls the input buffer 331 so that the input data input from the processing module of the previous stage is temporarily stored (written) in accordance with the state notification signal for requesting the output of the output pixel data.

Also, if there is no free storage capacity in the input buffer 331, the input buffer 331 is in a state in which the input data input to the image processing module 33 cannot be temporarily stored. In this case, the control section 334 outputs a signal indicating that the output of pixel data is not requested to the processing module of the previous stage, as a state notification signal indicating a state in which it is not possible to receive input data from the processing module of the previous stage. Also, at this time, the state notification signal may indicate that the output of pixel data is not requested to the processing module of the previous stage by a logic level of the signal for requesting the output of pixel data or may indicate that the output of pixel data is not requested to the processing module of the previous stage, for example, by a signal, such as a pipeline stall signal indicating that the pipeline processing is (temporarily) stopped, different from the signal for requesting the output of the pixel data.

Also, the control section 334 controls an operation of reading the pixel data temporarily stored in the input buffer 331, and the selection (switching) of the pixel data output to the arithmetic section 333 by the selector 332. In the control section 334, the control of the operation of reading pixel data from the input buffer 331 and the control of switching of the selector 332 are performed on the basis of a result of determining whether or not there is free storage capacity in the input buffer 331 and the state notification signal input from the processing module of the subsequent stage. Also, the state notification signal input from the processing module of the subsequent stage is a state notification signal output by the control section 334 provided in the processing module of the subsequent stage which is the output destination of the processed pixel data generated by the arithmetic section 333, and includes a signal indicating whether or not the processing module of the subsequent stage is in a state in which it is possible to receive the processed pixel data, that is, a signal indicating whether or not to request an output of the processed pixel data, and the like, as described above.

If the state notification signal input from the processing module of the subsequent stage indicates that it is possible to receive the processed pixel data, the control section 334 controls the selector 332 according to whether or not there is free storage capacity in the input buffer 331, and causes either the pixel data temporarily stored in the input buffer 331 or the pixel data currently input to the image processing module 33 to be output to the arithmetic section 333.

More specifically, if the storage capacity of the input buffer 331 is entirely not free, pixel data for at least one unit line is temporarily stored in the input buffer 331. In this case, the control section 334 controls the input buffer 331 so that the temporarily stored pixel data is read, and controls the selector 332 so that the pixel data output from the input buffer 331 is transferred to the arithmetic section 333. Thereby, the arithmetic section 333 outputs the processed pixel data generated by performing an arithmetic operation of image processing on the pixel data temporarily stored in the input buffer 331 to the image processing module 33 of the subsequent stage. At this time, if the input data according to the state notification signal for requesting the output of the output pixel data is input from the processing module of the previous stage, the control section 334 controls the input buffer 331 so that the input data which has been input is temporarily stored (written) in the free storage capacity.

Also, when the storage capacity of the input buffer 331 is entirely free, no pixel data for any unit line is temporarily stored in the input buffer 331. In this case, the control section 334 controls the input buffer 331 so that the operation is stopped. Thereby, the image processing module 33 can reduce power consumption of the input buffer 331. Then, the control section 334 controls the selector 332 so that the pixel data currently input to the image processing module 33 is output as it is, that is, the currently input pixel data is directly output to the arithmetic section 333 without being temporarily stored in the input buffer 331. Thereby, the arithmetic section 333 outputs the processed pixel data generated by performing the arithmetic operation of image processing on the pixel data currently input to the image processing module 33 to the image processing module 33 of the subsequent stage.

On the other hand, if the state notification signal input from the processing module of the subsequent stage indicates that it is not possible to receive the processed pixel data and there is free storage capacity in the input buffer 331, the control section 334 controls the input buffer 331 so that the input data input to the image processing module 33 is temporarily stored (written) in the free storage capacity.

Also, if the state notification signal input from the processing module of the subsequent stage indicates that it is not possible to receive the processed pixel data and there is no free storage capacity in the input buffer 331, no input data is input from the processing module of the previous stage because the control section 334 outputs a state notification signal indicating that it is not possible to receive the input data to the processing module of the previous stage. Thus, the control section 334 does not control the operation of the input buffer 331.

With such a configuration, each the processing module provided in the image processing section 30 performs reception of the input data from the processing module of the previous stage and selection (switching) of the pixel data on which the arithmetic section 333 performs an arithmetic operation of image processing on the basis of the state of there being free storage capacity in the input buffer 331.

Figure 4:
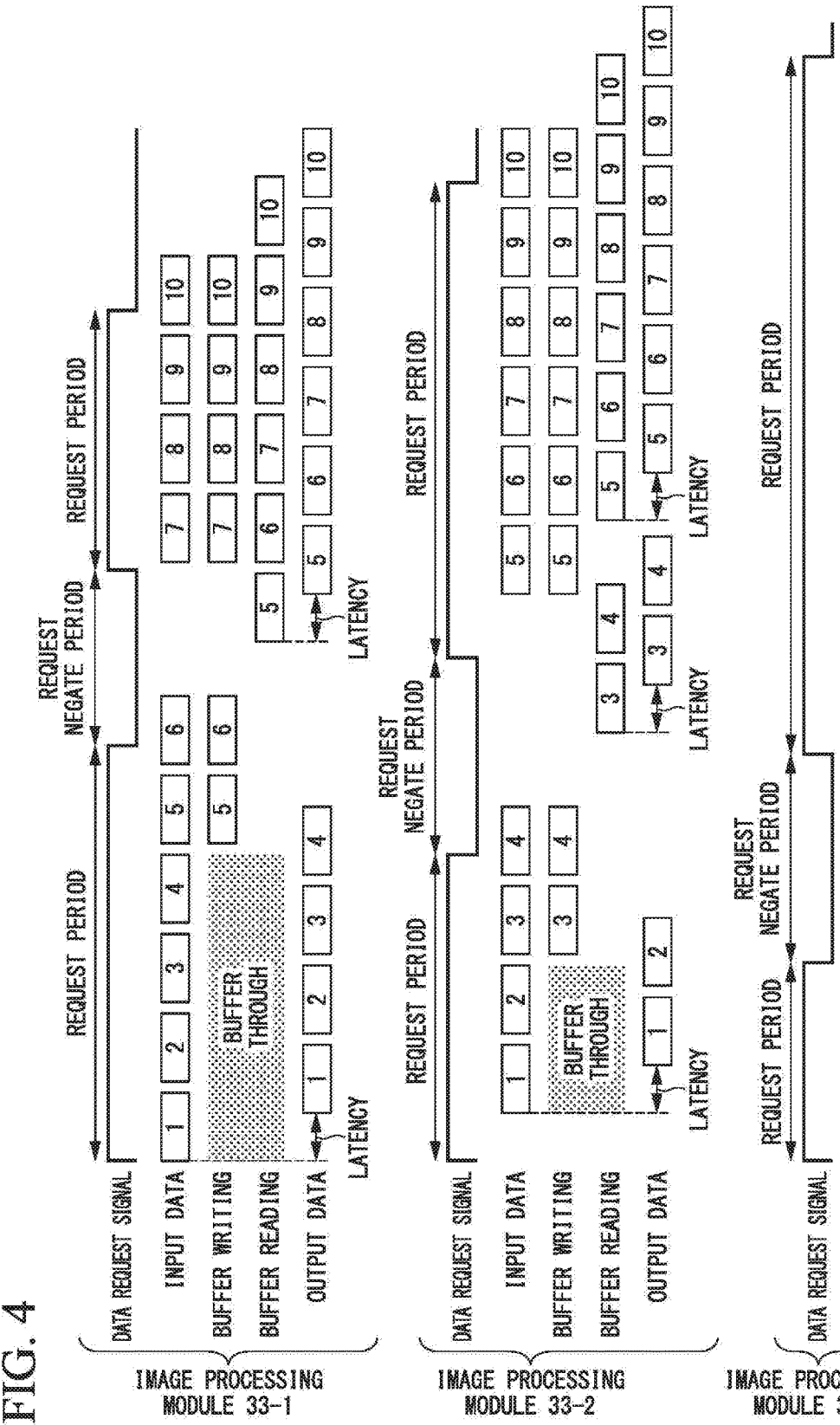
FIG. 4 is a timing chart showing an example of an operation of the image processing module in the image processing section provided in the image processing device of the first embodiment of the present invention.

Next, an operation of each processing module provided in the image processing section 30 will be described. FIG. 4 is a timing chart showing an example of an operation of the image processing module 33 in the image processing section 30 provided in the image processing device 1 of the first embodiment of the present invention. In FIG. 4, an example of delivery of the processed pixel data from the image processing module 33-1 to the image processing module 33-2 when the image processing section 30 performs the pipeline processing according to a configuration in which the input DMA module 32, the image processing modules 33-1 to 33-3 of the first configuration, and the output DMA module 34 are connected in series (a pipeline connection) as shown in FIG. 1 is shown.

In FIG. 4, input data to be input, buffer writing indicating writing of the input data to the input buffer 331, buffer reading indicating reading of the input data from the input buffer 331, and output data to be output are shown with respect to each of the image processing module 33-1 and the image processing module 33-2. Also, in FIG. 4, a signal for requesting the output of input data (hereinafter referred to as a "data request signal") is shown as the state notification signal output to the processing module of the previous stage by each of the image processing module 33-1 and the image processing module 33-2. Also, in FIG. 4, a data request signal output as the state notification signal by the image processing module 33-3 connected to the subsequent stage of the image processing module 33-2 is also shown.

In the description of FIG. 4, it is assumed that image processing is performed using one unit line as one unit of processing. In FIG. 4, numbers indicating the number of the unit lines are shown with respect to the input data, the buffer writing, the buffer reading, and the output data. Also, it is assumed that each processing module provided in the image processing section 30 includes a data buffer of a capacity capable of storing pixel data for two unit lines. In the following description, in order to distinguish between the respective component elements provided in the image processing module 33-1 and the respective component elements provided in the image processing module 33-2, the component element is indicated by adding "-" given to the image processing module 33 and a numeral portion subsequent to "-", subsequently to a reference numeral assigned to each component element. For example, the control section 334 provided in the image processing module 33-1 is represented as a "control section 334-1" and the control section 334 provided in the image processing module 33-2 is represented as a "control section 334-2".

When the image processing section 30 starts the pipeline processing, each of the image processing module 33-1, the image processing module 33-2, the image processing module 33-3, and the output DMA module 34 outputs a data request signal for requesting an output of input data to the processing module of the previous stage. This is because the storage capacity of the input buffer 331 provided in each image processing module 33 is entirely free in a first step in which the image processing section 30 starts the pipeline processing and therefore it is possible to receive input data. In this case, the arithmetic section 333-1 provided in the image processing module 33-1 and the arithmetic section 333-2 provided in the image processing module 33-2 are in a state in which image processing on the input pixel data can be immediately performed. Also, this is because the output DMA module 34 is in a state in which the input data (the processed pixel data) which has been input can be immediately output to the DRAM 20 via the DMA bus 10 in the first step in which the image processing section 30 starts the pipeline processing.

Also, in FIG. 4, a period during which the data request signal has a "High" level represents a request period during which each processing module is in a state in which it is possible to receive pixel data and a period during which the data request signal has a "Low" level represents a request negate period during which each processing module is in a state in which it is not possible to receive pixel data.

When a data request signal is input from the image processing module 33-1 of the subsequent stage, the input DMA module 32 first sequentially reads pixel data of the first unit line stored in the DRAM 20 via the DMA bus 10 for each unit line. Then, the input DMA module 32 outputs the read pixel data to the image processing module 33-1. At this time, the image processing module 33-1 connected to the subsequent stage of the input DMA module 32 is indicated to be in a state in which it is possible to receive the pixel data, by outputting the data request signal of the "High" level. Thus, the input DMA module 32 outputs the read pixel data to the image processing module 33-1 as it is, without temporarily storing the read pixel data in the data buffer. At this time, the input DMA module 32 stops the operation of the data buffer and reduces the power consumption of the data buffer. Thereafter, the input DMA module 32 reads pixel data of the second unit line stored in the DRAM 20 and starts an output to the image processing module 33-1.

Also, when a data request signal is input from the image processing module 33-2 of the subsequent stage, the image processing module 33-1 performs image processing on pixel data of the first unit line input from the input DMA module 32. At this time, as described above, the image processing module 33-1 is in a state in which the storage capacity of the input buffer 331-1 is entirely free, and is in a state in which the arithmetic section 333-1 can immediately performs the image processing on the input pixel data. Also, at this time, the image processing module 33-2 connected to the subsequent stage of the image processing module 33-1 is indicated to be in a state in which it is possible to receive the processed pixel data, by outputting the data request signal of the "High" level. Thus, the control section 334-1 controls the selector 332-1 so that the pixel data of the first unit line currently input from the input DMA module 32 of the previous stage is output to the arithmetic section 333-1 as it is. Also, the control section 334-1 performs control so that the operation of the input buffer 331-1 is stopped and reduces the power consumption of the input buffer 331-1. Thereby, the arithmetic section 333-1 outputs the processed pixel data generated by performing an arithmetic operation of image processing on the pixel data of the first unit line input via the selector 332-1 to the image processing module 33-2 of the subsequent stage. Also, the processed pixel data output from the image processing module 33-1 is output after being delayed by a delay time (hereinafter referred to as "latency") until the processed pixel data is output after pixel data generated by the arithmetic section 333-1 performing the arithmetic operation of image processing is input. Thereafter, the image processing module 33-1 starts the image processing on the pixel data of the second unit line input from the input DMA module 32.

Also, when the data request signal is input from the image processing module 33-3 of the subsequent stage, the image processing module 33-2 performs image processing on the processed pixel data corresponding to the first unit line input from the image processing module 33-1. At this time, as described above, the image processing module 33-2 is also in a state in which the storage capacity of the input buffer 331-2 is entirely free, and is in a state in which the arithmetic section 333-2 can immediately perform the image processing on the input the processed pixel data. Also, at this time, the image processing module 33-3 connected to the subsequent stage of the image processing module 33-2 is also indicated to be in a state in which it is possible to receive the processed pixel data, by outputting the data request signal of the "High" level. Thus, the control section 334-2 also controls the selector 332-2 so that the processed pixel data corresponding to the first unit line currently input from the image processing module 33-1 of the previous stage is output to the arithmetic section 333-2 as it is. Also, the control section 334-2 performs control so that the operation of the input buffer 331-2 is stopped and reduces the power consumption of the input buffer 331-2. Thereby, the arithmetic section 333-2 performs an arithmetic operation of image processing on the processed pixel data corresponding to the first unit line input via the selector 332-2 and outputs the processed pixel data delayed by latency in the arithmetic section 333-2 to the image processing module 33-3. Thereafter, the image processing module 33-2 also starts image processing on the processed pixel data corresponding to a second unit line input from the image processing module 33-1.

In this manner, in the image processing section 30, each processing module sequentially delivers input data, which has been input, to a processing module of the subsequent stage connected to the pipeline. At this time, because each processing module is in a state in which the storage capacity of the input buffer 331 provided in the processing module itself is entirely free and the processing module of the subsequent stage is in a state in which it is possible to receive input data, the input data input from the processing module of the previous stage is not temporarily stored in the input buffer 331 and is output to the processing module of the subsequent stage by performing an arithmetic operation of imaging processing as it is or immediately. In FIG. 4, with respect to the buffer writing and buffer reading of each of the image processing module 33-1 and the image processing module 33-2, a period during which input data is not temporarily stored in the input buffer 331, that is, a period during which input data is transferred to the arithmetic section 333 without involving the input buffer 331, is shown as a buffer through period.

Then, the image processing section 30 performs control so that each processing module stops the operation of the data buffer (the input buffer 331) provided in the processing module itself. That is, the image processing section 30 stops the operation of the data buffer (the input buffer 331) in the buffer through period in each processing module. Thereby, the image processing section 30 can reduce the power consumption of the data buffer (the input buffer 331) provided in each processing module.

Here, an operation when the image processing module 33-3 of the subsequent stage is in a state in which it is not possible to receive the processed pixel data due to any cause when the image processing module 33-2 outputs the processed pixel data corresponding to the second unit line will be described. In this case, the image processing module 33-3 indicates in a state in which it is not possible to receive the processed pixel data, that is, indicates that an output of input data is not requested, due to setting the data request signal to be output to the image processing module 33-2 to the "Low" level. Also, a method by which each processing module notifies the processing module of the previous stage that the output of the input data is not requested is not limited to the method based on the logic level of the data request signal as described above, and may be a method of providing a notification indicating that each processing module is in a state in which it is not possible to receive the pixel data by outputting the pipeline stall signal.

At this time, because the image processing module 33-2 is in a state in which the storage capacity of the input buffer 331-2 is entirely free (a state in which a storage capacity for two unit lines is free), the control section 334-2 controls the input buffer 331-2 so that the processed pixel data corresponding to the third unit line currently input from the image processing module 33-1 of the previous stage is temporarily stored. Thereby, the input buffer 331-2 stores the processed pixel data corresponding to the third unit line, and is in a state in which the storage capacity for one unit line is free (remains).

Further, in the image processing module 33-2, the control section 334-2 controls the input buffer 331-2 so that the processed pixel data corresponding to the fourth unit line currently input from the image processing module 33-1 of the previous stage is temporarily stored. Thereby, the input buffer 331-2 also stores the processed pixel data corresponding to the fourth unit line and is in a state in which there is no free storage capacity. In other words, the image processing module 33-2 is in a state in which it is not possible to receive the processed pixel data from the image processing module 33-1. Thus, in order to indicate that the image processing module 33-2 is in a state in which it is not possible to receive the processed pixel data, the control section 334-2 sets the data request signal to be output to the image processing module 33-1 to the "Low" level.

Thereby, in the image processing module 33-1, similar to the control section 334-2 provided in the image processing module 33-2, the control section 334-1 controls the input buffer 331-1 so that pixel data of each of fifth and sixth unit lines input from the input DMA module 32 is temporarily stored. Thereby, the input buffer 331-1 stores the pixel data of each of the fifth and sixth unit lines, and the image processing module 33-1 is in a state in which it is not possible to receive the pixel data from the input DMA module 32. Thus, similar to the control section 334-2, the control section 334-1 also sets the data request signal to be output to the input DMA module 32 to the "Low" level so as to indicate that the image processing module 33-1 is in a state in which it is not possible to receive the pixel data.

Thereby, the input DMA module 32 defers reading of pixel data of a seventh unit line stored in the DRAM 20. The input DMA module 32 also includes a data buffer of a capacity in which pixel data for two unit lines can be stored. Thus, the input DMA module 32 may read pixel data of each of seventh and eighth unit lines, temporarily store the read pixel data in the data buffer, and then defer reading of pixel data of a ninth unit line.

In this manner, in the image processing section 30, if the data request signal input from the processing module of the subsequent stage connected to the pipeline indicates a state in which it is not possible to receive pixel data, each processing module stops an output of the output data to the processing module of the subsequent stage. Each processing module provides a notification indicating that the processing module itself is in a state in which it is not possible to receive the pixel data after temporarily storing pixel data in the amount according to the free storage capacity of the input buffer 331 provided in the processing module itself.

Also, in the image processing section 30, each processing module performs processing for each unit of processing. Accordingly, even when the image processing section 30 provides a notification indicating a state in which it is not possible to receive the pixel data while each processing module outputs the pixel data of one unit of processing to the processing module of the subsequent stage, an output of the output data to the processing module of the subsequent stage is stopped after all pixel data of a unit of processing which is currently being output is output.

Next, an operation when the image processing module 33-3 is in a state in which it is possible to receive the processed pixel data will be described. In this case, the image processing module 33-3 indicates in a state in which it is possible to receive the processed pixel data, that is, indicates that an output of input data is requested, due to setting the data request signal to be output to the image processing module 33-2 to the "High" level. Also, a method by which each processing module notifies the processing module of the previous stage that the output of the input data is requested again is not limited to the method based on the logic level of the data request signal as described above, and may be a method of providing a notification indicating that each processing module is in a state in which it is possible to receive the pixel data by stopping an output of the pipeline stall signal.

At this time, the image processing module 33-2 is in a state in which there is no free storage capacity in the input buffer 331-2 (a state in which the processed pixel data corresponding to the third and fourth unit lines is temporarily stored). Thus, the control section 334-2 controls the input buffer 331-2 and the selector 332-2 so that the processed pixel data corresponding to the third unit line stored in the input buffer 331-2 is first read from the input buffer 331-2 and the read processed pixel is output to the arithmetic section 333-2. Thereby, the input buffer 331-2 outputs the processed pixel data corresponding to the stored third unit line to the selector 332-2, and the selector 332-2 outputs the processed pixel data corresponding to the third unit line input from the input buffer 331-2 to the arithmetic section 333-2. Then, the arithmetic section 333-2 performs an arithmetic operation of image processing on the processed pixel data corresponding to the third unit line output from the selector 332-2 and outputs the processed pixel data delayed by latency in the arithmetic section 333-2 to the image processing module 33-3 of the subsequent stage.

Also, the input buffer 331-2 outputs the processed pixel data corresponding to the third unit line, so that a state in which the storage capacity for one unit line is free (remains). That is, the image processing module 33-2 is in a state in which it is possible to receive the processed pixel data from the image processing module 33-1. Thus, in order to indicate that the image processing module 33-2 is in a state in which it is possible to receive the processed pixel data, the control section 334-2 sets the data request signal to be output to the image processing module 33-1 to the "High" level.

Further, in the image processing module 33-2, there is free storage capacity in the input buffer 331-2, but the processed pixel data corresponding to the fourth unit line is temporarily stored. Thus, the control section 334-2 controls the input buffer 331-2 and the selector 332-2 so that the processed pixel data corresponding to the fourth unit line stored in the input buffer 331-2 is read from the input buffer 331-2 and output to the arithmetic section 333-2. Thereby, the processed pixel data corresponding to the fourth unit line stored in the input buffer 331-2 is input to the arithmetic section 333-2 via the selector 332-2. Then, the arithmetic section 333-2 outputs the processed pixel data generated by performing an arithmetic operation of image processing on the processed pixel data corresponding to the fourth unit line input via the selector 332-2 to the image processing module 33-3.

Also, in the image processing module 33-1, when the data request signal input from the image processing module 33-2 of the subsequent stage has the "High" level and a notification indicating that the image processing module 33-2 is in a state in which it is possible to receive the processed pixel data is provided, the control section 334-1 outputs the processed pixel data corresponding to the fifth and the sixth unit lines to the image processing module 33-2 as in the control section 334-2 provided in the image processing module 33-2. More specifically, the control section 334-1 controls the input buffer 331-2 and the selector 332-2 so that the pixel data of each of the fifth and sixth unit lines stored in the input buffer 331-1 are sequentially read and output to the arithmetic section 333-1. Thereby, the arithmetic section 333-1 performs an arithmetic operation of image processing on the pixel data of each of the fifth and sixth unit lines sequentially input via the selector 332-1 and outputs the processed pixel data delayed by latency in the arithmetic section 333-1 to the image processing module 33-2 of the subsequent stage.

Also, when pixel data of the fifth unit line is output, the input buffer 331-1 is in a state in which the storage capacity of one unit line is free (remains), and the image processing module 33-1 is in a state in which it is possible to receive pixel data from the input DMA module 32. Thus, similar to the control section 334-2, the control section 334-1 sets the data request signal to be output to the input DMA module 32 to the "High" level so as to indicate that the image processing module 33-1 is in a state in which it is possible to receive pixel data.

Thereby, the input DMA module 32 resumes the reading of the pixel data from the seventh unit line stored in the DRAM 20, and outputs the read pixel data to the image processing module 33-1. If the input DMA module 32 stores the pixel data of each of the seventh and eighth unit lines in the data buffer when the reading of the pixel data stored in the DRAM 20 is deferred, the reading of the pixel data may be resumed from the ninth unit line after the pixel data of the seventh unit line stored in the data buffer is output to the image processing module 33-1.

In this manner, in the image processing section 30, if the data request signal input from the processing module of the subsequent stage connected to the pipeline is changed to a state in which it is possible to receive pixel data again, each processing module resumes the output of the output data to the processing module of the subsequent stage. At this time, each processing module sequentially outputs from the pixel data stored in the input buffer 331 provided in the processing module itself to the processing module of the subsequent stage. Each processing module provides a notification indicating that the processing module itself is in a state in which it is possible to receive pixel data after storage capacity in the input buffer 331 provided in the processing module itself becomes free. Thereafter, each processing module temporarily stores the input pixel data in the input buffer 331 provided in the processing module itself, reads the stored pixel data, and sequentially outputs the read pixel data to the processing module of the subsequent stage.

Thereafter, by repeating the above-described operation, the image processing section 30 performs a series of image processing on block image data by sequentially performing the pipeline processing on pixel data included in the block image data for each unit line in each processing module connected to the pipeline.

Although not shown in the example of the timing chart of the operation of the image processing module 33 shown in FIG. 4, if a state in which it is possible to output the input data to the processing module of the subsequent stage as it is without involving the input buffer 331 again is reached after the image processing section 30 resumes the output of the output data to the processing module of the subsequent stage by each processing module, control is performed to stop the operation of the input buffer 331 as in the first step of starting the pipeline processing shown in FIG. 4. Thereby, the image processing section 30 can reduce power consumption of the input buffer 331 provided in each processing module.

Figure 5:
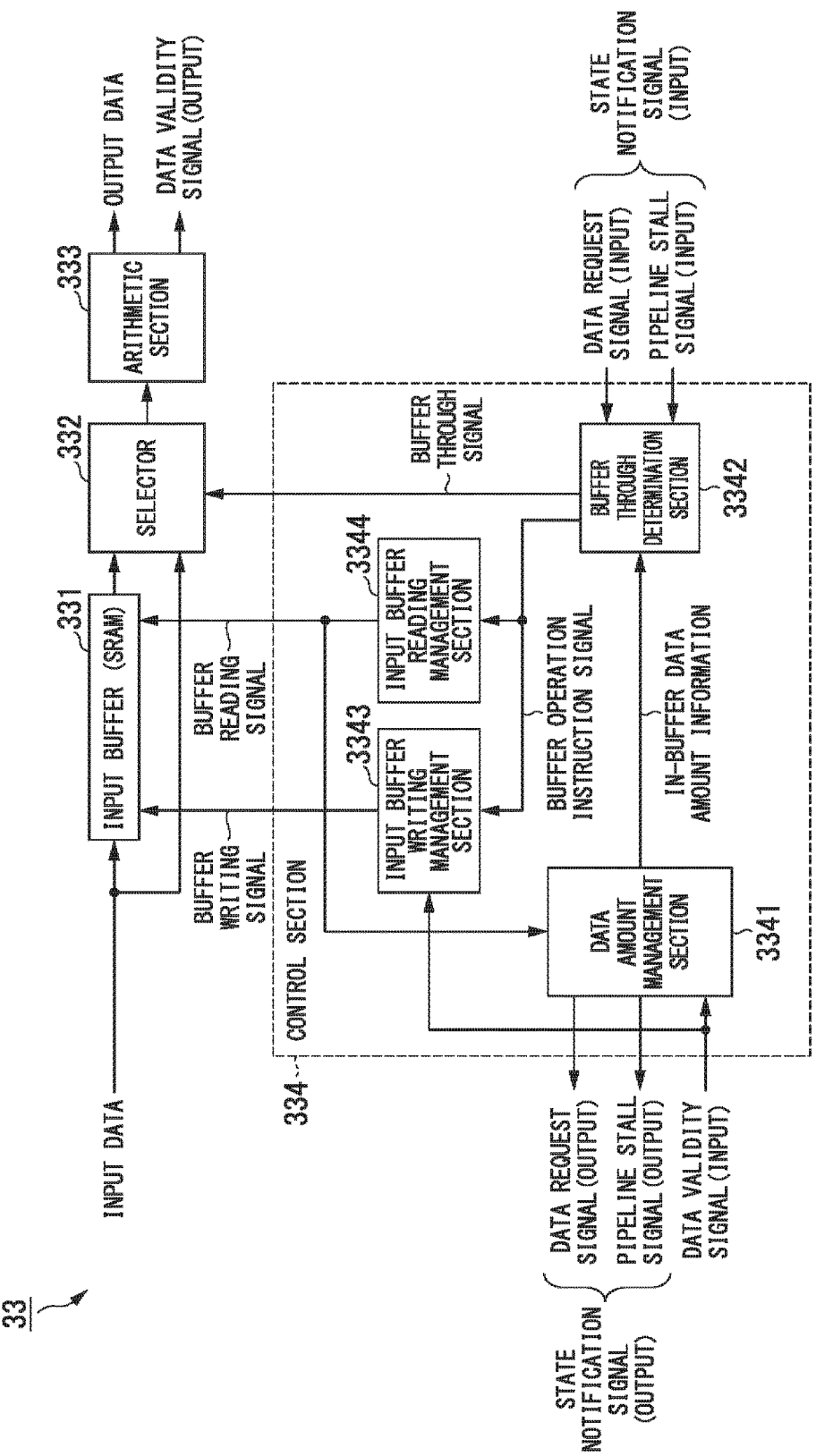
FIG. 5 is a block diagram showing a configuration of the image processing module in the image processing section provided in the image processing device of the first embodiment of the present invention.

Next, the configuration of the control section 334 provided in the image processing module 33 will be described. FIG. 5 is a block diagram showing a configuration of the image processing module 33 in the image processing section 30 provided in the image processing device 1 of the first embodiment of the present invention. In FIG. 5, a schematic configuration of the control section 334 provided in the image processing module 33 of the first configuration is shown. In FIG. 5, the input buffer 331, the selector 332, and the arithmetic section 333 provided in the image processing module 33 of the first configuration are also shown together. The control section 334 shown in FIG. 5 includes a data amount management section 3341, a buffer through determination section 3342, an input buffer writing management section 3343, and an input buffer reading management section 3344.

In order to manage the data amount of input data (pixel data) temporarily stored in the input buffer 331, the data amount management section 3341 manages the number of unit lines to be temporarily stored in the input buffer 331. More specifically, the data amount management section 3341 determines whether or not the currently input pixel data is valid pixel data to be temporarily stored in the input buffer 331, on the basis of a data validity signal input from the processing module of the previous stage. The data validity signal is a signal indicating whether or not pixel data included in the unit line is valid pixel data. By counting the number of pieces of valid pixel data, the data amount management section 3341 determines whether or not all valid pixel data included in the unit line currently being input has been input from the processing module of the previous stage.

Also, when a unit line including valid pixel data is input, the data amount management section 3341 updates information indicating the number of unit lines temporarily stored in the input buffer 331 (hereinafter referred to as "in-buffer data amount information"). For example, the data amount management section 3341 increments the number of unit lines indicated by the in-buffer data amount information by 1 every time a unit line including valid pixel data is input from the processing module of the previous stage. A timing at which the data amount management section 3341 increments the in-buffer data amount information is a timing at which first valid pixel data is determined in the unit line. This is because, when the first valid pixel data is input in one unit line, valid pixel data included in the unit line is continuously input thereafter.

Also, the data amount management section 3341, counts the number of pieces of pixel data read from the input buffer 331 on the basis of a buffer reading signal for reading the pixel data temporarily stored in the input buffer 331 by the input buffer reading management section 3344, and determines whether or not all the pixel data included in the unit line to be currently output has been read from the input buffer 331. If it is determined that all the pixel data included in the unit line has been read, the data amount management section 3341 updates the in-buffer data amount information. For example, the data amount management section 3341 decrements the number of unit lines indicated by the in-buffer data amount information by 1 every time it is determined that one unit line has been read. A timing at which the data amount management section 3341 subtracts the in-buffer data amount information is a timing at which reading of last pixel data included in the unit line is determined, that is, a timing at which all the pixel data included in one unit line has been read from the input buffer 331. This is because pixel data of each of other unit lines cannot be temporarily stored in the input buffer 331 unless reading of all pixel data included in one unit line is completed.

In this manner, the data amount management section 3341 manages the number of unit lines temporarily stored in the input buffer 331. Then, the data amount management section 3341 outputs the in-buffer data amount information to the buffer through determination section 3342 and the input buffer reading management section 3344.

Also, if it is determined that there is free storage capacity in the input buffer 331 as a result of managing the amount of data (the number of unit lines) temporarily stored in the input buffer 331, the data amount management section 3341 outputs a data request signal for requesting an output of input data to the processing module of the previous stage. More specifically, if a value obtained by subtracting the number of unit lines indicated by the in-buffer data amount information, that is, the current number of unit lines temporarily stored in the input buffer 331, from the maximum number of unit lines capable of being temporarily stored in the input buffer 331 is a value larger than "0", the data amount management section 3341 determines that there is free storage capacity in the input buffer 331 and outputs a data request signal indicating that an output of input data is requested to the processing module of the previous stage. In other words, if the number of unit lines indicated by the in-buffer data amount information is smaller than the maximum number of unit lines capable of being temporarily stored in the input buffer 331, the data amount management section 3341 outputs the data request signal indicating that the output of the input data is requested to the processing module of the previous stage. Also, if the value obtained by subtracting the number of unit lines indicated by the in-buffer data amount information from the maximum number of unit lines capable of being temporarily stored in the input buffer 331 is "0", the data amount management section 3341 determines that there is no free storage capacity in the input buffer 331 and sets the data request signal to be output to the processing module of the previous stage to a logic level indicating that an output of input data is not requested. At this time, the data amount management section 3341 outputs the pipeline stall signal indicating that the output of input data is not requested to the processing module of the previous stage. That is, if the number of unit lines indicated by the in-buffer data amount information is the same as the maximum number of unit lines capable of being temporarily stored in the input buffer 331, the data amount management section 3341 sets the data request signal to be output to the processing module of the previous stage to the logic level indicating that the output of the input data is not requested and outputs the pipeline stall signal to the processing module of the previous stage.

Also, in the operation of the above-described the data amount management section 3341, if the number of unit lines indicated by the in-buffer data amount information is smaller than the maximum number of unit lines capable of being temporarily stored in the input buffer 331, an operation of outputting the data request signal indicating that the output of the input data is requested to the processing module of the previous stage is shown. However, for example, if a delay time (latency) until the input data is input from the processing module of the previous stage in accordance with the data request signal indicating that the output of the input data is requested is known in advance, the data amount management section 3341 may predict the timing at which reading of the pixel data from the input buffer 331 is completed and output the data request signal for requesting the output of the input data at a timing before reading of the pixel data is completed.

The buffer through determination section 3342 determines a method of controlling the input buffer 331 on the basis of the in-buffer data amount information input from the data amount management section 3341 and the data request signal and the pipeline stall signal input from the processing module of the subsequent stage. In other words, the buffer through determination section 3342 performs a determination of whether or not to temporarily store (write) the input data input to the image processing module 33 in the input buffer 331, a determination of whether or not to read input data (pixel data) temporarily stored in the input buffer 331, and a determination of the selection (switching) of the input data (the pixel data) to be output to the arithmetic section 333. On the basis of the determination result, the buffer through determination section 3342 outputs an instruction signal for instructing each of the input buffer writing management section 3343 and the input buffer reading management section 3344 to perform an operation on the input buffer 331 (hereinafter referred to as a "buffer operation instruction signal"). Also, the buffer through determination section 3342 outputs a control signal for controlling the selector 332 (hereinafter referred to as a "buffer through signal").

More specifically, if the data request signal is input from the processing module of the subsequent stage and the pipeline stall signal is not input, the buffer through determination section 3342 determines that the processing module of the subsequent stage is in a state in which it is possible to receive the processed pixel data. When the number of unit lines indicated by the in-buffer data amount information is a value larger than "0", the buffer through determination section 3342 determines that at least one unit line of pixel data is temporarily stored in the input buffer 331. In this case, the buffer through determination section 3342 outputs a buffer operation instruction signal for instructing the input buffer writing management section 3343 to temporarily store (write) the input data input to the image processing module 33. Also, the buffer through determination section 3342 outputs a buffer operation instruction signal for instructing the input buffer reading management section 3344 to read the pixel data temporarily stored in the input buffer 331. Further, the buffer through determination section 3342 outputs a buffer through signal for performing control so that the pixel data output from the input buffer 331 is output to the arithmetic section 333, to the selector 332. Thereby, the pixel data currently input to the image processing module 33 is read after being temporarily stored in the input buffer 331, that is, the pixel data is transferred to the arithmetic section 333 after being temporarily stored in the input buffer 331.

Also, if the buffer through determination section 3342 determines that the processing module of the subsequent stage is in a state in which it is possible to receive the processed pixel data, it is determined that no pixel data for any unit line is temporarily stored in the input buffer 331 when the number of unit lines indicated by the in-buffer data amount information is "0". That is, the buffer through determination section 3342 determines that the pipeline processing is smoothly performed without delaying the flow of the processed pixel data. In this case, the buffer through determination section 3342 outputs a buffer operation instruction signal for instructing the input buffer writing management section 3343 to stop the operation of the input buffer 331. Also, the buffer through determination section 3342 outputs a buffer operation instruction signal for instructing the input buffer reading management section 3344 not to read the pixel data temporarily stored in the input buffer 331. Further, the buffer through determination section 3342 outputs the buffer through signal for performing control so that input data (pixel data) currently input to the image processing module 33 is output to the arithmetic section 333 as it is, to the selector 332. Thereby, the pixel data currently input to the image processing module 33 is transferred to the arithmetic section 333 directly without being temporarily stored in the input buffer 331, that is, by bypassing the input buffer 331.

Also, if the data request signal is not input from the processing module of the subsequent stage, or if the data request signal is input from the processing module of the subsequent stage but if the pipeline stall signal is not input, the buffer through determination section 3342 determines that the processing module of the subsequent stage is in a state in which it is not possible to receive the processed pixel data. In this case, when the number of unit lines indicated by the in-buffer data amount information is smaller than the maximum number of unit lines capable of being temporarily stored in the input buffer 331, the buffer through determination section 3342 determines that pixel data for at least one unit line can be temporarily stored to the input buffer 331. In this case, the buffer through determination section 3342 outputs the buffer operation instruction signal for instructing the input buffer writing management section 3343 to temporarily store (write) the input data input to the image processing module 33. Thereby, the pixel data currently input to the image processing module 33 is temporarily stored in the input buffer 331.

At this time, the buffer through determination section 3342 outputs the buffer operation instruction signal for instructing the input buffer reading management section 3344 not to read the pixel data temporarily stored in the input buffer 331. Further, the buffer through determination section 3342 outputs the buffer through signal for performing control so that pixel data output from the input buffer 331 is output to the arithmetic section 333, to the selector 332. Thereby, pixel data which is the same as pixel data currently input to the image processing module 33 and temporarily stored in the input buffer 331 (pixel data which is not currently subjected to an arithmetic operation of image processing) is not output to the arithmetic section 333 through a path bypassing the input buffer 331, and it is possible to prevent the arithmetic section 333 from consuming power by performing an unnecessary operation.

Also, in the image processing module 33, if it is determined that the processing module of the subsequent stage is in a state in which it is not possible to receive the processed pixel data and when the number of unit lines indicated by the in-buffer data amount information is the same as the maximum number of unit lines capable of being temporarily stored in the input buffer 331, the data amount management section 3341 outputs the pipeline stall signal indicating that the output of the input data is not requested to the processing module of the previous stage. Thus, no input data from the processing module of the previous stage is input to the image processing module 33. At this time, the buffer through determination section 3342 instructs each of the input buffer writing management section 3343 and the input buffer reading management section 3344 not to perform write and read operations on the input buffer 331. That is, the buffer through determination section 3342 issues an instruction so that the pixel data temporarily stored in the input buffer 331 is held. Also, at this time, the buffer through determination section 3342 outputs the buffer through signal for performing control so that pixel data output from the input buffer 331 is not output to the arithmetic section 333, to the selector 332. Thereby, no pixel data is input to the arithmetic section 333.

In accordance with the buffer operation instruction signal input from the buffer through determination section 3342, the input buffer writing management section 3343 generates a control signal (hereinafter referred to as a "buffer writing signal") for performing an operation of writing input data to the input buffer 331, and outputs the generated control signal to the input buffer 331. More specifically, if the buffer operation instruction signal for issuing an instruction for temporarily storing (writing) the input data input to the image processing module 33 is input, the input buffer writing management section 3343 generates the buffer writing signal for writing the input data (pixel data) to the input buffer 331, that indicated to be valid by the data validity signal input from the processing module of the previous stage, and outputs the generated buffer writing signal to the input buffer 331. If the buffer operation instruction signal for issuing an instruction for stopping the operation of the input buffer 331 is input, the input buffer writing management section 3343 does not output the buffer writing signal for writing input data to the input buffer 331, to the input buffer 331. When the buffer operation instruction signal for issuing the instruction for stopping the operation of the input buffer 331 is input, the input buffer writing management section 3343 may generate, for example, a control signal for stopping the operation by setting the input buffer 331 to a sleep state, and output the generated control signal to the input buffer 331. In FIG. 5, only the buffer writing signal is shown, and the illustration of the control signal for stopping the operation of the input buffer 331, for example, such as a sleep signal is omitted.

In accordance with the buffer operation instruction signal input from the buffer through determination section 3342, the input buffer reading management section 3344 generates a control signal (hereinafter referred to as a "buffer reading signal") for performing an operation of reading pixel data from the input buffer 331, and outputs the generated control signal to the input buffer 331. More specifically, if the buffer operation instruction signal for issuing an instruction for reading the pixel data temporarily stored in the input buffer 331 is input, the input buffer reading management section 3344 generates the buffer reading signal for performing sequential reading from a unit line temporarily stored at the earliest time among the unit lines temporarily stored in the input buffer 331, and outputs the generated buffer reading signal to the input buffer 331. Also, if the buffer operation instruction signal for issuing an instruction for not reading the pixel data temporarily stored in the input buffer 331 is input, the input buffer reading management section 3344 does not output the buffer reading signal for reading pixel data of each of the unit lines temporarily stored in the input buffer 331, to the input buffer 331.

Figure 6:
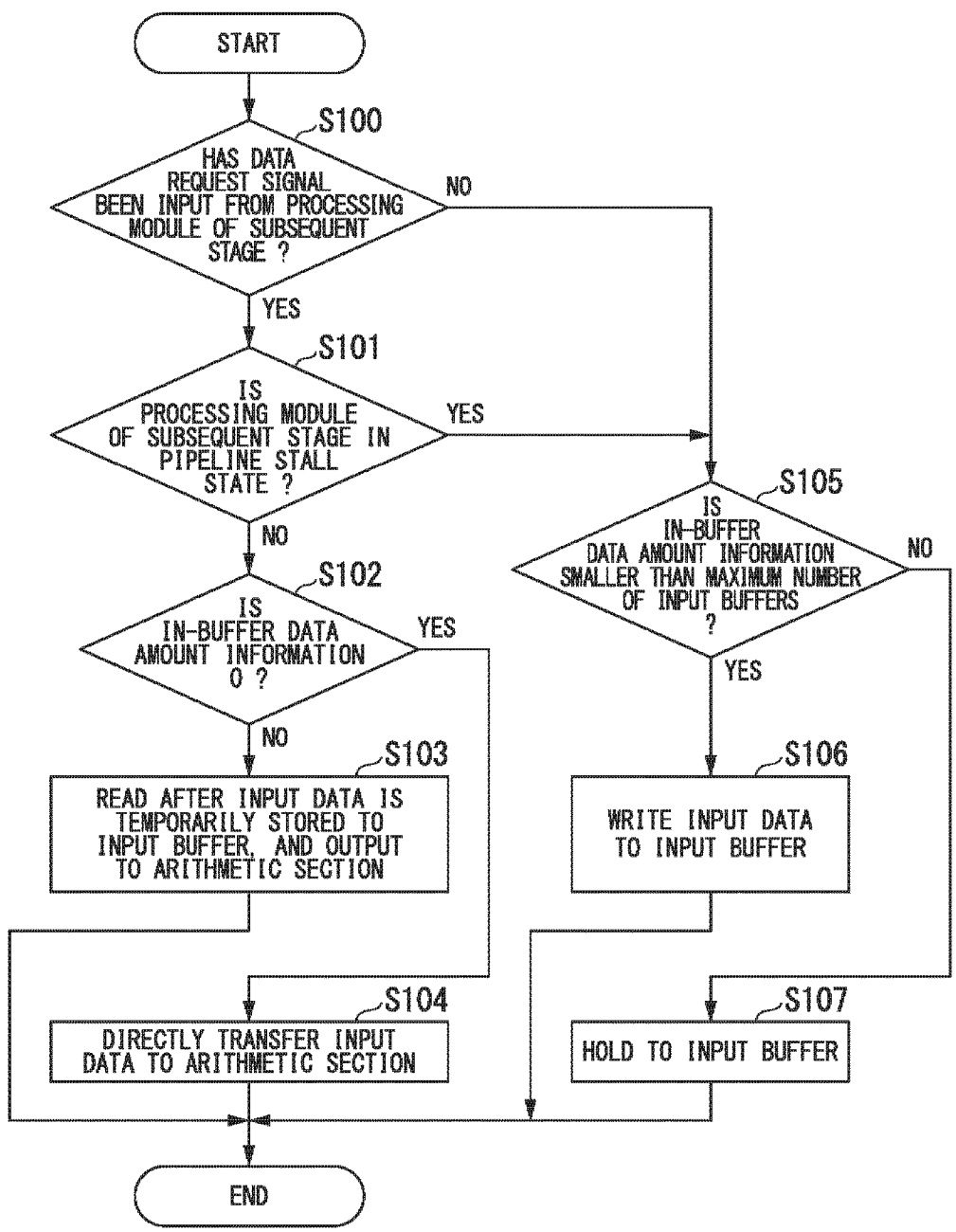
FIG. 6 is a flowchart showing a processing procedure of the image processing module in the image processing section provided in the image processing device of the first embodiment of the present invention.

Here, each determination process to be performed by the buffer through determination section 3342 will be described. FIG. 6 is a flowchart showing a processing procedure of the image processing module 33 in the image processing section 30 provided in the image processing device 1 of the first embodiment of the present invention. In FIG. 6, a determination processing procedure of the control method of the input buffer 331 in the buffer through determination section 3342 provided in the image processing module 33 of the first configuration is shown.

When the image processing section 30 starts pipeline processing, the buffer through determination section 3342 is first determines whether or not a data request signal has been input from the processing module of the subsequent stage, that is, whether or not the processing module of the subsequent stage has requested the output of the processed pixel data (step S100). In step S100, if it is determined that no data request signal has been input, that is, if it is determined that the processing module of the subsequent stage has not requested the output of the processed pixel data ("NO" in step S100), the buffer through determination section 3342 proceeds to step S105.

On the other hand, in step S100, if it is determined that the data request signal has been input, that is, if it is determined that the processing module of the subsequent stage has requested the output of the processed pixel data ("YES" in step S100), the buffer through determination section 3342 determines whether or not the pipeline processing of the processing module of the subsequent stage has been (temporarily) stopped and the state is a pipeline stall state in which it is not possible to receive the processed pixel data (step S101). The determination in step S101 can be performed according to whether or not the pipeline stall signal has been input from the processing module of the subsequent stage.

In step S101, if it is determined that the processing module of the subsequent stage is not in the pipeline stall state ("NO" in step S101), the buffer through determination section 3342 determines whether or not the number of unit lines indicated by the in-buffer data amount information input from the data amount management section 3341 is "0" in step S102.

In step S102, if the number of unit lines indicated by the in-buffer data amount information is not "0", that is, the number of unit lines indicated by the in-buffer data amount information is a value larger than "0" ("NO" in step S102), the buffer through determination section 3342 determines that the pixel data for at least one unit line is temporarily stored in the input buffer 331. Then, the buffer through determination section 3342 controls each of the input buffer writing management section 3343, the input buffer reading management section 3344, and the selector 332 so that the pixel data currently input to the image processing module 33 is read after being temporarily stored in the input buffer 331 and is transferred to the arithmetic section 333 (step S103). More specifically, the buffer through determination section 3342 outputs the buffer operation instruction signal for instructing the input buffer writing management section 3343 to temporarily store (write) the input data input to the image processing module 33, and outputs the buffer operation instruction signal for instructing the input buffer reading management section 3344 to read the pixel data temporarily stored in the input buffer 331. Also, the buffer through determination section 3342 outputs the buffer through signal for performing control so that the pixel data output from the input buffer 331 is output to the arithmetic section 333, to the selector 332.

On the other hand, in step S102, when the number of unit lines indicated by the in-buffer data amount information is "0" ("YES" in step S102), the buffer through determination section 3342 determines that no data for any unit line is temporarily stored in the input buffer 331, that is, the storage capacity of the input buffer 331 is entirely free. This is a state in which the flow of pixel data is not delayed and pipeline processing is smoothly performed. Thus, the buffer through determination section 3342 controls each of the input buffer writing management section 3343, the input buffer reading management section 3344, and the selector 332 so that the pixel data currently input to the image processing module 33 is directly transmitted to the arithmetic section 333 (step S104). That is, the buffer through determination section 3342 performs control so that the pixel data currently input to the image processing module 33 bypasses the input buffer 331 and is transferred to the arithmetic section 333. More specifically, the buffer through determination section 3342 outputs the buffer operation instruction signal for instructing the input buffer writing management section 3343 to stop the operation of the input buffer 331, and outputs the buffer operation instruction signal for instructing the input buffer reading management section 3344 not to perform reading of the input buffer 331. Also, the buffer through determination section 3342 outputs a buffer through signal for performing control for outputting the input data (pixel data) currently input to the image processing module 33 to the arithmetic section 333 as it is, to the selector 332.

On the other hand, if it is determined that the processing module of the subsequent stage is in the pipeline stall state in step S101 ("YES" in step S101) or if it is determined that the processing module of the subsequent stage does not request an output of the processed pixel data in step S100 ("NO" in step S100), the buffer through determination section 3342 proceeds to step S105. In step S105, the buffer through determination section 3342 determines whether or not the number of unit lines indicated by the in-buffer data amount information input from the data amount management section 3341 is smaller than the maximum number of unit lines capable of being temporarily stored in the input buffer 331.

In step S105, if the number of unit lines indicated by the in-buffer data amount information is smaller than the maximum number of unit lines capable of being temporarily stored in the input buffer 331 ("YES" in step S105), the buffer through determination section 3342 determines that it is possible to temporarily store pixel data for at least one unit line in the input buffer 331. Then, the buffer through determination section 3342 controls each of the input buffer writing management section 3343, the input buffer reading management section 3344, and the selector 332 so that the pixel data currently input to the image processing module 33 is temporarily stored in the input buffer 331 (step S106). More specifically, the buffer through determination section 3342 outputs the buffer operation instruction signal for instructing the input buffer writing management section 3343 to temporarily store (write) the input data input to the image processing module 33, and outputs the buffer operation instruction signal for instructing the input buffer reading management section 3344 not to read the pixel data temporarily stored in the input buffer 331. Also, the buffer through determination section 3342 outputs the buffer through signal for performing control so that the pixel data output from the input buffer 331 is output to the arithmetic section 333, to the selector 332.

On the other hand, in step S105, if it is determined that the number of unit lines indicated by the in-buffer data amount information is not smaller than the maximum number of unit lines capable of being temporarily stored in the input buffer 331, that is, if the number of unit lines indicated by the in-buffer data amount information is the same as the maximum number of unit lines capable of being temporarily stored in the input buffer 331 ("NO" in step S105), the buffer through determination section 3342 determines that it is not possible to temporarily store input data (pixel data) in the input buffer 331. Then, the buffer through determination section 3342 performs control so that each of the input buffer writing management section 3343, the input buffer reading management section 3344, and the selector 332 does not operate, that is, the pixel data temporarily stored in the input buffer 331 is held (step S107). At this time, in the image processing module 33, the data amount management section 3341 outputs the data request signal or the pipeline stall signal indicating that the output of the input data is not requested to the processing module of the previous stage.

According to such processing, the buffer through determination section 3342 determines a method of controlling the input buffer 331, and controls the input buffer writing management section 3343, the input buffer reading management section 3344, and the selector 332 on the basis of a determination result. The determination of the method of controlling the input buffer 331 in the buffer through determination section 3342 is repeated until the pipeline processing in the image processing section 30 is completed.

According to such configuration and processing, the control section 334 provided in the image processing module 33 of the first configuration requests the processing module of the previous stage to provide input data (pixel data) on the basis of the state of there being free storage capacity in the input buffer 331. Also, the control section 334 performs writing of the input data (pixel data) input from the processing module of the previous stage to the image processing module 33 to the input buffer 331, reading of pixel data temporarily stored in the input buffer 331, and selection (switching) of pixel data on which the arithmetic section 333 performs an arithmetic operation of image processing, on the basis of the state of there being free storage capacity in the input buffer 331 and the operation state of the processing module of the subsequent stage. Thereby, the arithmetic section 333 outputs the processed pixel data generated by performing the arithmetic operation of image processing on the input pixel data to the processing module of the subsequent stage. Also, in FIG. 5, a configuration in which the arithmetic section 333 generates a data validity signal indicating whether or not the processed pixel data included in the unit line generated by performing the arithmetic operation of image processing is valid the processed pixel data and outputs the generated data validity signal to the processing module of the subsequent stage is shown.

Figure 7:
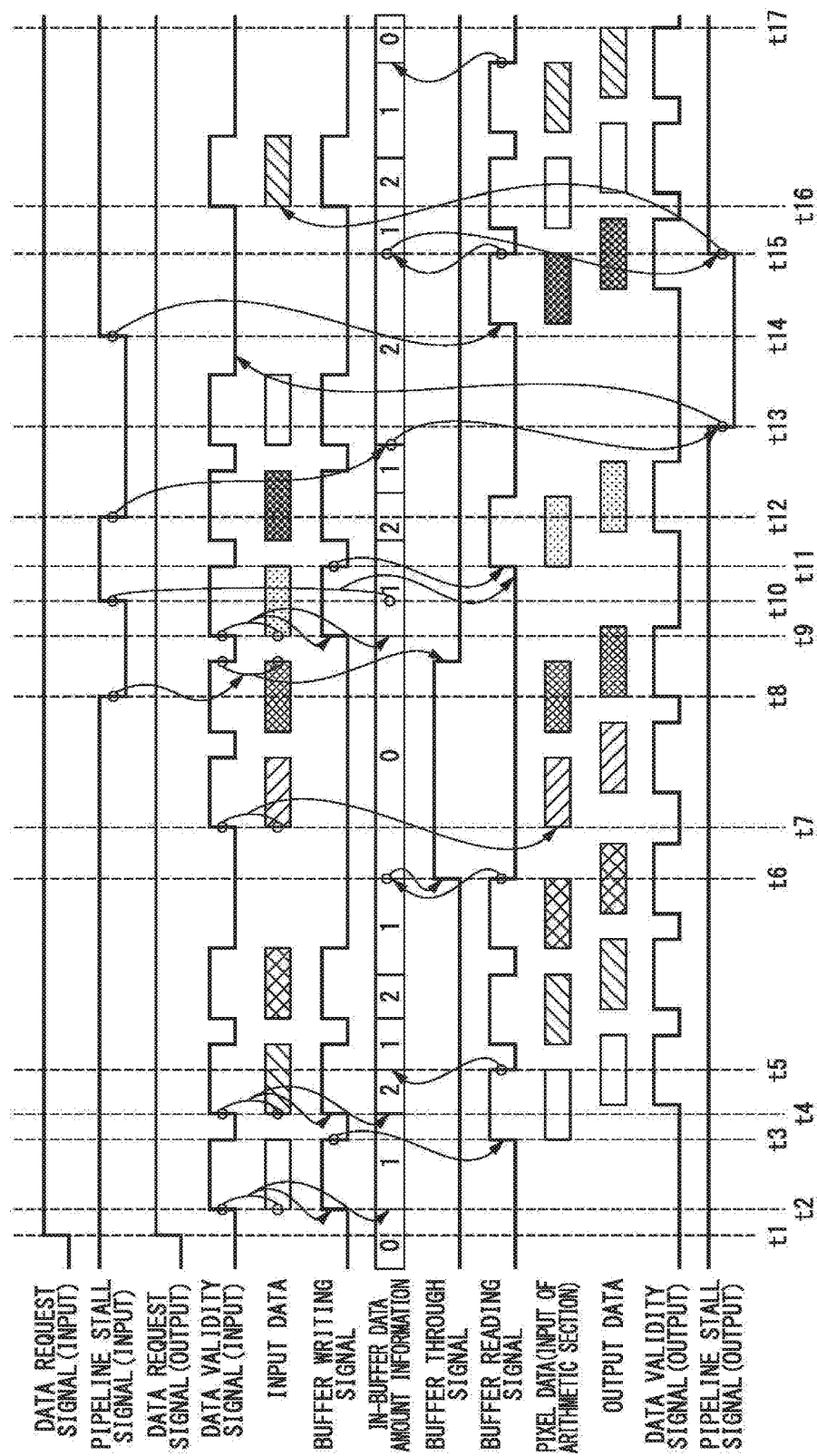
FIG. 7 is a timing chart showing an example of an operation of the image processing module in the image processing section provided in the image processing device of the first embodiment of the present invention.

Next, an operation of the image processing module 33 of the first configuration shown in FIG. 5 will be described. FIG. 7 is a timing chart showing an example of an operation of the image processing module 33 in the image processing section 30 provided in the image processing device 1 of the first embodiment of the present invention. In FIG. 7, an example of the delivery of pixel data in the image processing module 33 of the first configuration shown in FIG. 5 is shown.

In FIG. 7, the data request signal and the pipeline stall signal input from the processing module of the subsequent stage to the image processing module 33 and the output data output to the processing module of the subsequent stage by the image processing module 33 are shown. Also, in FIG. 7, the data request signal, the pipeline stall signal, and the data validity signal output by the image processing module 33 to the processing module of the previous stage, and the data validity signal input from the processing module of the previous stage to the image processing module 33 are shown. Further, in FIG. 7, the buffer through signal output by the control section 334 provided in the image processing module 33 to the selector 332, the buffer writing signal output by the input buffer writing management section 3343 inside the control section 334 provided in the image processing module 33 to the input buffer 331, and the buffer reading signal output by the input buffer reading management section 3344 inside the control section 334 provided in the image processing module 33 to the input buffer 331 are shown. Further, in FIG. 7, the in-buffer data amount information which is a signal in the control section 334 provided in the image processing module 33 and the pixel data input to the arithmetic section 333 provided in the image processing module 33 are shown.

In the description of FIG. 7, it is assumed that image processing is performed using one unit line as one unit of processing. Also, it is assumed that the input buffer 331 provided in the image processing module 33 has a storage capacity capable of storing pixel data for two unit lines.

When the image processing section 30 starts the pipeline processing, each processing module provided in the image processing section 30 outputs the data request signal for requesting an output of input data to the processing module of the previous stage at a timing t1. In the image processing module 33, the data amount management section 3341 outputs the data request signal to the processing module of the previous stage. Also, in the image processing module 33, the data request signal is input from the processing module of the subsequent stage.

Also, because the image processing module 33 is in a state in which image processing on input pixel data can be performed immediately in a first step in which the image processing section 30 starts the pipeline processing as described above, the control section 334 performs control so that the pixel data bypasses the input buffer 331 and is transferred to the arithmetic section 333. However, in the following description, in order to facilitate the description of a change in the in-buffer data amount information, at the first step in which the image processing section 30 starts the pipeline processing, it is assumed that the control section 334 performs control so that pixel data input to the image processing module 33 is read after being temporarily stored in the input buffer 331, and transferred to the arithmetic section 333.

At the image processing module 33, in accordance with the data request signal output at the timing t1, the input data and the data validity signal are input from the processing module of the previous stage. The data amount management section 3341 updates the in-buffer data amount information on the basis of the input data valid signal. More specifically, if it is determined that a unit line including valid pixel data has been input according to the "High" level of the data valid signal, the data amount management section 3341 adds "1" to the number of unit lines indicated by the in-buffer data amount information at a timing t2. Thereby, the in-buffer data amount information="1".

Also, in accordance with the "High" level of the data request signal input from the processing module of the subsequent stage and the "High" level of the pipeline stall signal, the buffer through determination section 3342 issues an instruction so that the input data input from the processing module of the previous stage is temporarily stored in the input buffer 331 and transferred to the arithmetic section 333 after being. Thereby, the input buffer writing management section 3343 outputs the buffer writing signal to the input buffer 331 at the timing t2. Also, the buffer writing signal is a signal including a plurality of pulse signals for temporarily storing (writing) the pixel data of each of the unit lines currently input in the input buffer 331, and is shown as the "High" level signal in FIG. 7. Also, at the timing t2, the buffer through determination section 3342 outputs a buffer through signal of the "Low" level in order to control the selector 332 so that the pixel data output from the input buffer 331 is output to the arithmetic section 333.

Thereafter, when the currently input unit line is temporarily stored in the input buffer 331, the input buffer reading management section 3344 outputs the buffer reading signal to the input buffer 331 at a timing t3. The buffer reading signal is also a signal including a plurality of pulse signals for reading pixel data of each of the unit lines temporarily stored in the input buffer 331, and is shown as a signal of the "High" level, as in the buffer writing signal, in FIG. 7. Thereby, at the arithmetic section 333, the pixel data read from the input buffer 331 is sequentially input via the selector 332. Then, the arithmetic section 333 performs an arithmetic operation of image processing on the input pixel data and outputs the processed pixel data delayed by latency in the arithmetic section 333 as output data to the processing module of the subsequent stage. At this time, the arithmetic section 333 also outputs a data validity signal indicating valid pixel data included in the output data to the processing module of the subsequent stage.

Thereafter, when it is determined that the next unit line including valid pixel data has been input, the data amount management section 3341 updates the in-buffer data amount information at a timing t4. Thereby, the in-buffer data amount information="2".

Also, when it is determined that all the pixel data included in the currently read unit line has been read from the input buffer 331, the data amount management section 3341 updates the in-buffer data amount information at a timing t5.

More specifically, the data amount management section 3341 subtracts "1" from the number of unit lines indicated by the in-buffer data amount information. Thereby, the in-buffer data amount information="1".

Thereafter, similarly, temporary storage (writing) of pixel data of each of the unit lines currently input by the input buffer writing management section 3343 in the input buffer 331, reading of the pixel data of the each of the unit lines currently read by the input buffer reading management section 3344 from the input buffer 331, and updating of the in-buffer data amount information by the data amount management section 3341, are repeated. Thereby, the arithmetic section 333 outputs the processed pixel data generated by performing the arithmetic operation of image processing on the pixel data transferred after being temporarily stored in the input buffer 331 and the data validity signal to the processing module of the subsequent stage.

Thereafter, when reading of pixel data of each of all the unit lines temporarily stored in the input buffer 331 by the input buffer reading management section 3344 is completed, the in-buffer data amount information updated by the data amount management section 3341 is "0" at a timing t6. Thereby, the buffer through determination section 3342 performs control so that the input data input from the processing module of the previous stage is output as pixel data to the arithmetic section 333 as it is and sets the buffer through signal to the "High" level, in accordance with the "High" level of the data request signal, the "High" level of the pipeline stall signal, and the in-buffer data amount information="0", input from the processing module of the subsequent stage.

Thereby, when a unit line including valid pixel data is input from the processing module of the previous stage at the subsequent timing t7, the pixel data is sequentially input to the arithmetic section 333 via the selector 332 as it is. Then, the arithmetic section 333 outputs the processed pixel data generated by performing the arithmetic operation of image processing on the input pixel data, and the data validity signal to the processing module of the subsequent stage.

Thereafter, similarly, the pixel data of each of unit lines currently input from the processing module of the previous stage is directly input to the arithmetic section 333, and the arithmetic section 333 repeats an output of the processed pixel data and the data validity signal to the processing module of the subsequent stages.

Thereafter, at a timing t8, when the pipeline stall signal input from the processing module of the subsequent stage is set to the "Low" level indicating that it is not possible to receive the processed pixel data because of the pipeline stall state, the buffer through determination section 3342 sets the buffer through signal to the "Low" level after the transfer of the pixel data of each of the unit lines currently input from the processing module of the previous stage, to the arithmetic section 333 is completed. Also, the buffer through determination section 3342 performs control so that input data input from the processing module of the previous stage is temporarily stored in the input buffer 331, in accordance with the "High" level of the data request signal input from the processing module of the subsequent stage and the "Low" level of the pipeline stall signal.

Thereby, the input data input from the processing module of the previous stage at a timing t9 is temporarily stored in the input buffer 331 in accordance with the buffer writing signal output from the input buffer writing management section 3343 to the input buffer 331. At this time, the data amount management section 3341 updates the in-buffer data amount information. Thereby, the in-buffer data amount information="1".

Thereafter, at a timing t10, the pipeline stall signal input from the processing module of the subsequent stage is set to the "High" level indicating that it is possible to receive the processed pixel data because the pipeline stall state is canceled. Then, in accordance with the "High" levels of the data request signal and the pipeline stall signal input from the processing module of the subsequent stage and the in-buffer data amount information="1", the buffer through determination section 3342 issues an instruction so that input data input from the processing module of the previous stage is temporarily stored in the input buffer 331 and transferred to the arithmetic section 333. Thereby, after temporary storage (writing) of pixel data of each of unit lines currently input from the processing module of the previous stage in the input buffer 331 is completed, the input buffer reading management section 3344 outputs the buffer reading signal to the input buffer 331 at a timing t11. Then, the pixel data read from the input buffer 331 is sequentially input to the arithmetic section 333. The arithmetic section 333 delays the processed pixel data generated by performing the arithmetic operation of image processing on the input pixel data and the data validity signal by latency in the arithmetic section 333, and outputs to the processing module of the subsequent stage.

In FIG. 7, the buffer reading signal is output at the timing t11 after the temporary storage (writing) of the pixel data of each of currently input unit lines in the input buffer 331 is completed. This is because, when the buffer through determination section 3342 issues an instruction so that the input data which has been input is temporarily stored in the input buffer 331 and transferred to the arithmetic section 333, pixel data for any unit line is not yet temporarily stored in the input buffer 331. Accordingly, if the pixel data for one or more unit lines is already temporarily stored in the input buffer 331 when the buffer through determination section 3342 issues the instruction, the input buffer reading management section 3344 may output the buffer reading signal to the input buffer 331 without awaiting the completion of the temporary storage (writing) of pixel data of each of currently input unit lines in the input buffer 331.

Thereafter, similarly, temporary storage (writing) of pixel data of each of the unit lines currently input by the input buffer writing management section 3343 in the input buffer 331, reading of the pixel data of the each of the unit lines currently read by the input buffer reading management section 3344 from the input buffer 331, and updating of the in-buffer data amount information by the data amount management section 3341, are repeated. Thereby, the arithmetic section 333 outputs the processed pixel data generated by performing the arithmetic operation of image processing on the pixel data transferred after being temporarily stored in the input buffer 331 and the data validity signal to the processing module of the subsequent stage.

Thereafter, when the pipeline stall signal input from the processing module of the subsequent stage is set to the "Low" level at a timing t12, the input buffer writing management section 3343 continues only temporary storage (writing) of the pixel data of each of the unit lines input in the input buffer 331. Then, at a timing t13 after the in-buffer data amount information="2", the data amount management section 3341 sets the pipeline stall signal to be output to the processing module of the previous stage to the "Low" level indicating that it is not possible to receive the processed pixel data because of the pipeline stall state. Thereby, after the input of the pixel data of each of the current unit lines is completed, the output of the input data from the processing module of the previous stage is temporarily stopped.

Thereafter, when the pipeline stall signal input from the processing module of the subsequent stage is set to the "High" level at a timing t14, in accordance with the "High" levels of the data request signal and the pipeline stall signal input from the processing module of the subsequent stage and the in-buffer data amount information="2", the buffer through determination section 3342 issues an instruction so that the input data input from the processing module of the previous stage is temporarily stored in the input buffer 331 and transferred to the arithmetic section 333 after being. Thereby, the input buffer reading management section 3344 outputs the buffer reading signal to the input buffer 331, and the arithmetic section 333 delays the processed pixel data generated by performing the arithmetic operation of image processing on the pixel data read from the input buffer 331 and the data validity signal by the latency in the arithmetic section 333, and outputs to the processing module of the subsequent stage.

Also, when reading of all pixel data of the unit line currently being read by the input buffer reading management section 3344 is completed, the in-buffer data amount information updated by the data amount management section 3341 is "1", at a timing t15. Thereby, the data amount management section 3341 sets the pipeline stall signal to be output to the processing module of the previous stage to the "High" level indicating that it is possible to receive the processed pixel data because the pipeline stall state is canceled. Thereby, the processing module of the previous stage resumes an output of the input data and the data validity signal, according to the data request signal at a timing t16.

Thereafter, similarly, temporary storage (writing) of pixel data of each of the unit lines currently input by the input buffer writing management section 3343 in the input buffer 331, reading of the pixel data of the each of the unit lines currently read by the input buffer reading management section 3344 from the input buffer 331, and updating of the in-buffer data amount information by the data amount management section 3341, are repeated. Then, the arithmetic section 333 repeats the output of the processed pixel data and the data validity signal corresponding to the pixel data input from the input buffer 331 to the processing module of the subsequent stage.

Thereafter, at timing t17, the image processing module 33 completes the process when outputs of the processed pixel data and the data validity signals corresponding to all the unit lines to the processing module of the subsequent stage are completed. When the processing by each processing module provided in the image processing section 30 is completed, the image processing section 30 completes the pipeline processing.

According to the first configuration of the first embodiment, there is provided an image processing device (the image processing device 1) includes a memory (the DRAM 20) and an image processing section (the image processing section 30), the DRAM 20 and the image processing section 30 being connected to a data bus (the DMA bus 10), the image processing section 30 including a pipeline in which a plurality of processing modules (the image processing modules 33-1 to 33-3) is connected in series, each processing modules (the image processing modules 33) being configured to perform a predetermined process on input data (the pixel data or the processed pixel data), and the image processing section 30 performing pipeline processing by the image processing modules 33 sequentially performing the process, wherein each of the image processing modules 33 includes: a data buffer (the input buffer 331) configured to temporarily store the pixel data or the processed pixel data in unit of processing; and a control section (the control section 334) configured to determine whether or not to store the pixel data or the processed pixel data in the input buffer 331 on the basis of a state of a processed pixel data flow in the pipeline processing and a state of the pixel data or the processed pixel data stored in the input buffer 331, and to select a path within the image processing module 33 by which the pixel data or the processed pixel data is transferred (to the arithmetic section 333) on the basis of a determination result, and to control an operation of the input buffer 331.

Also, according to the first configuration of the first embodiment, the image processing device 1 in which the control section 334 selects a path for reading and transferring the pixel data or the processed pixel data (to the arithmetic section 333) after the pixel data or the processed pixel data is temporarily stored in the input buffer 331 and causes the input buffer 331 to operate if the pixel data or the processed pixel data is able to be further stored in the input buffer 331 in a state in which the pixel data or the processed pixel data is stored in a storage capacity of the input buffer 331, the control section 334 selects a path for reading and transferring the pixel data or the processed pixel data (to the arithmetic section 333) after the pixel data or the processed pixel data is temporarily stored in the input buffer 331 and causes the input buffer 331 to operate so that the stored pixel data or the processed pixel data is held if the pixel data or the processed pixel data is unable to be further stored in the input buffer 331 in a state in which the pixel data or the processed pixel data flow in the pipeline processing is delayed, and the control section 334 selects a path along which the pixel data or the processed pixel data is transferred (to the arithmetic section 333) by bypassing the input buffer 331 without being stored in the input buffer 331 and causes an operation of the input buffer 331 to stop if the pixel data or the processed pixel data is not stored in all the storage capacity of the input buffer 331 in a state in which the processed pixel data flow in the pipeline processing is not delayed (a state which is not the pipeline stall state) is configured.

Also, according to the first configuration of the first embodiment, the image processing device 1 in which the control section 334 outputs a state notification signal indicating an operation state of the image processing module 33 provided with the control section 334 itself to the image processing module 33 of a previous stage in the configuration of the pipeline, and the control section 334 determines the state of the processed pixel data flow in the pipeline processing on the basis of the state notification signal input from the image processing module 33 of a subsequent stage in the configuration of the pipeline is configured.

Also, according to the first configuration of the first embodiment, the image processing device 1 in which the control section 334 determines the state of the pixel data or the processed pixel data flow in the pipeline processing on the basis of the state notification signals input from a plurality of the image processing modules 33 of the subsequent stages in the configuration of the pipeline is configured.

Also, according to the first configuration of the first embodiment, the image processing device 1 in which the state notification signal is a signal indicating whether or not it is possible to receive the pixel data or the processed pixel data on which the image processing module 33 of the previous stage has performed the process, the state notification signal includes a data request signal for requesting an output of the pixel data or the processed pixel data on which the image processing module 33 of the previous stage has performed the process, and the control section 334 determines that the pixel data or the processed pixel data flow in the pipeline processing is not delayed (the state is not the pipeline stall state) if the data request signal for requesting an output of the pixel data or the processed pixel data from the image processing module 33 of the subsequent stage is input is configured.

Also, according to the first configuration of the first embodiment, the image processing device 1 in which the control section 334 outputs the data request signal for requesting the output of the pixel data or the processed pixel data to the image processing module 33 of the previous stage if the pixel data or the processed pixel data is able to be stored in the input buffer 331 is configured.

Also, according to the first configuration of the first embodiment, the image processing device 1 in which the image processing module 33 further includes a selector (the selector 332) configured to select either one of the path along which the pixel data or the processed pixel data read from the input buffer 331 is transferred (to the arithmetic section 333) and the path along which the pixel data or the processed pixel data is transferred (to the arithmetic section 333) by bypassing the input buffer 331 as the path along which the pixel data or the processed pixel data is transferred (to the arithmetic section 333), the control section 334 includes a data amount management section (the data amount management section 3341) configured to manage the amount of pixel data or the processed pixel data stored in the input buffer 331 and output data amount information (the in-buffer data amount information) indicating the monitored amount of pixel data or the processed pixel data; a buffer through determination section (the buffer through determination section 3342) configured to determine an operation to be performed in the input buffer 331 on the basis of the in-buffer data amount information and the state of the processed pixel data flow in the pipeline processing and output an instruction signal (the buffer operation instruction signal) instructing the input buffer 331 to write the pixel data or the processed pixel data and read the pixel data or the processed pixel data from the input buffer 331 and a control signal (the buffer through signal) for selecting the path along which the pixel data or the processed pixel data is transferred (to the arithmetic section 333) on the basis of a determination result; a buffer writing management section (the input buffer writing management section 3343) configured to generate a buffer writing signal which is a control signal for controlling writing of the pixel data or the processed pixel data to the input buffer 331 in accordance with the buffer operation instruction signal for writing the pixel data or the processed pixel data to the input buffer 331; and a buffer reading management section (the input buffer reading management section 3344) configured to generate a buffer reading signal which is a control signal for controlling reading of the pixel data or the processed pixel data from the input buffer 331 in accordance with the buffer operation instruction signal for reading the pixel data or the processed pixel data from the input buffer 331, the data amount management section 3341 manages the amount of pixel data or the processed pixel data on the basis of the number of input pixel data or the processed pixel data and the buffer reading signal, the buffer through determination section 3342 outputs the buffer operation instruction signal for issuing an instruction for performing the writing of the pixel data or the processed pixel data to the input buffer 331 and the reading of the pixel data or the processed pixel data from the input buffer 331, and the buffer through signal for selecting a path for reading and transferring the pixel data or the processed pixel data (to the arithmetic section 333) after being the pixel data or the processed pixel data is temporarily stored in the input buffer 331 if the in-buffer data amount information indicates that the amount of pixel data or the processed pixel data is a value greater than 0, the buffer through determination section 3342 outputs the buffer operation instruction signal for issuing an instruction for stopping the writing of the pixel data or the processed pixel data to the input buffer 331 and the reading of the pixel data or the processed pixel data from the input buffer 331, and the buffer through signal for selecting a path along which the pixel data or the processed pixel data is transferred (to the arithmetic section 333) by bypassing the input buffer 331 if the in-buffer data amount information indicates that the amount of pixel data or the processed pixel data is 0, and the selector 332 selects a path according to the buffer through signal as the path along which the pixel data or the processed pixel data is transferred (to the arithmetic section 333) is configured.

Also, according to the first configuration of the first embodiment, there is provided an image processing method in an image processing device (the image processing device 1) includes a memory (the DRAM 20) and an image processing section (the image processing section 30), the DRAM 20 and the image processing section 30 being connected to a data bus (the DMA bus 10), the image processing section 30 including a pipeline in which a plurality of processing modules (the image processing modules 33-1 to 33-3) is connected in series, each processing modules (the image processing modules 33) being configured to perform a predetermined process on input data (the pixel data or the processed pixel data), and the image processing section 30 performing pipeline processing by the image processing modules 33 sequentially performing the process, the image processing method including: a control step, by each of the image processing modules 33, determining whether or not to store the pixel data or the processed pixel data in a data buffer (the input buffer 331) on the basis of a state of a the processed pixel data flow in the pipeline processing and a state of the pixel data or the processed pixel data stored in the input buffer 331 temporarily storing the pixel data or the processed pixel data in unit of processing, and selecting a path within the image processing module 33 by which the pixel data or the processed pixel data is transferred (to the arithmetic section 333) on the basis of a determination result, and to controlling an operation of the input buffer 331.

As described above, the image processing module 33 of the first configuration requests the processing module connected to the previous stage in the pipeline configuration to provide input data on the basis of the state of there being free storage capacity in the input buffer 331, and controls temporary storage (writing) of the input data (pixel data) input from the processing module of the previous stage in the input buffer 331. Also, the image processing module 33 of the first configuration controls reading of pixel data temporarily stored in the input buffer 331 and selection (switching) of pixel data on which the arithmetic section 333 performs an arithmetic operation of image processing, on the basis of the state of there being free storage capacity in the input buffer 331 and the operation state of the processing module connected to the subsequent stage in the pipeline configuration. Thereby, the image processing module 33 of the first configuration can perform control so that the input data input from the processing module of the previous stage bypasses the input buffer 331 and is transferred to the arithmetic section 333, if the processing modules in the subsequent stage are not in the pipeline stall state and the entire storage capacity of the input buffer 331 is free. Then, the image processing module 33 of the first configuration can output the processed pixel data, generated by the arithmetic section 333 directly performing an arithmetic operation of image processing on the input data from the processing module of the previous stage transferred by bypassing the input buffer 331, to the processing module of the subsequent stage. Also, the image processing module 33 of the first configuration transfers the input data input from the processing module of the previous stage to the arithmetic section 333 that is bypasses the input buffer 331, so that it is possible to reduce power consumption of the input buffer 331 by stopping the operation of the input buffer 331 at that time. Thereby, in the image processing section 30 constituting the pipeline in the image processing module 33 of the first configuration, it is possible to perform desired image processing even when writing of data to the data buffer and reading of data from the data buffer are not necessarily performed when the pipeline is configured in the conventional processing module, and it is possible to reduce the power consumption in pipeline processing without deteriorating the performance of pipeline processing.

In the operation of the image processing module 33 of the first configuration described with reference to FIG. 4 and FIG. 7, after control is performed so that the input data input from the processing module of the previous stage is read and transferred to the arithmetic section 333 after being temporarily stored in the input buffer 331, control is not actively performed so that the data bypasses the input buffer 331 and is transferred to the arithmetic section 333 again. That is, in the operation of the image processing module 33 of the first configuration shown in FIG. 4 and FIG. 7, a process of performing control so that the input data bypasses the input buffer 331 and is transferred to the arithmetic section 333 depends on operation states of the processing module of the previous stage and the processing module of the subsequent stage. However, in the image processing module 33 of the first configuration, the control section 334 can intentionally perform control so that the input data bypasses the input buffer 331 and is transferred to the arithmetic section 333.

Figure 8:
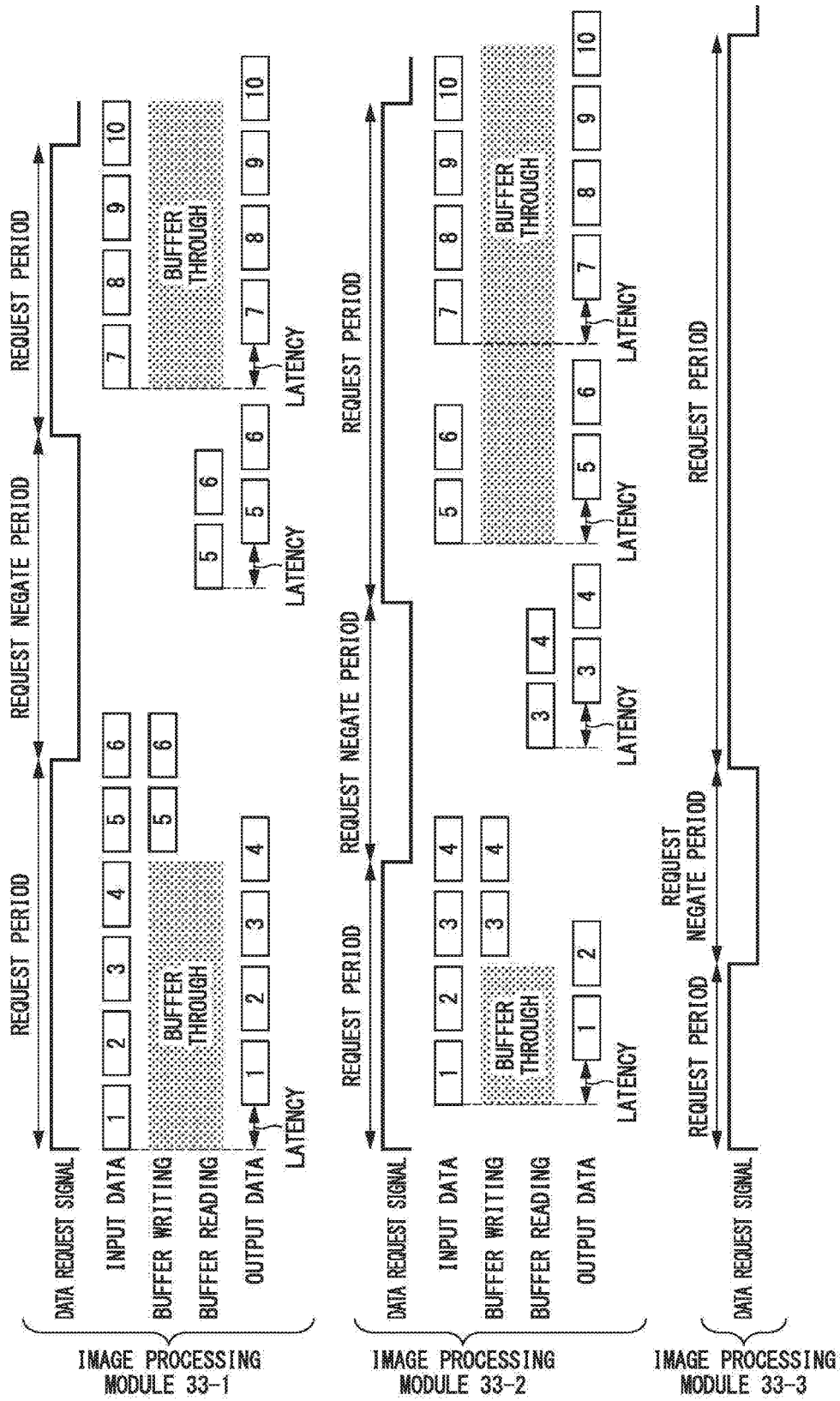
FIG. 8 is a timing chart showing an example of another operation of the image processing module in the image processing section provided in the image processing device of the first embodiment of the present invention.

Here, an operation in which the image processing module 33 provided in the image processing section 30 intentionally performs control so that the input data bypasses the input buffer 331 and is transferred to the arithmetic section 333 will be described. FIG. 8 is a timing chart showing an example of another operation of the image processing module 33 in the image processing section 30 provided in the image processing device 1 of the first embodiment of the present invention. In FIG. 8, as in the example of the operation of the image processing module 33 of the first configuration shown in FIG. 4, an example of delivery of the processed pixel data from the image processing module 33-1 to the image processing module 33-2 when the image processing section 30 performs the pipeline processing according to a configuration in which the input DMA module 32, the image processing modules 33-1 to 33-3 of the first configuration, and the output DMA module 34 are connected in series (a pipeline connection) is shown.

In FIG. 8, as in the example of the operation of the image processing module 33 shown in FIG. 4, input data, buffer writing, buffer reading, and output data are shown with respect to each of the image processing module 33-1 and the image processing module 33-2, and the data request signal is shown as the state notification signal to be output by each image processing module 33 to the processing module of the previous stage.

Also, in the description of FIG. 8, as in the example of the operation of the image processing module 33 shown in FIG. 4, it is assumed that image processing is performed using one unit line as one unit of processing, and numbers indicating the number of the unit lines are shown with respect to the input data, the buffer writing, the buffer reading, and the output data. Also, in the description of FIG. 8, as in the example of the operation of the image processing module 33 shown in FIG. 4, it is assumed that each processing module provided in the image processing section 30 includes a data buffer of a capacity capable of storing pixel data for two unit lines. Also, in the description of FIG. 8, as in the example of the operation of the image processing module 33 shown in FIG. 4, in order to distinguish between the respective component elements provided in each the image processing module 33, the component element is indicated by adding "-" given to the image processing module 33 and a numeral portion subsequent to "-", subsequently to a reference numeral assigned to each component element.

Also in FIG. 8, as in the example of the operation of the image processing module 33 shown in FIG. 4, a period during which the data request signal has a "High" level represents a request period during which each image processing module 33 is in a state in which it is possible to receive pixel data and a period during which the data request signal has a "Low" level represents a request negate period during which each image processing module 33 is in a state in which it is not possible to receive pixel data.

When the image processing section 30 starts the pipeline processing, each of the image processing module 33-1, the image processing module 33-2, the image processing module 33-3, and the output DMA module 34 outputs a data request signal for requesting an output of input data to the processing module of the previous stage. Also, in the timing chart of the operation of the image processing module 33 shown in FIG. 8, an operation of a first step in which the image processing section 30 starts the pipeline processing is similar to the example of the operation of the image processing module 33 shown in FIG. 4. Accordingly, a detailed description of the operation of each processing module will be omitted. Also, because the operation of each processing module until the request negate period of the image processing module 33-2 is end in the timing chart of the operation of the image processing module 33 shown in FIG. 8 is also similar to the example of the operation of the image processing module 33 shown in FIG. 4, a detailed description thereof will be omitted.

Next, an operation in which the image processing module 33-3 is in a state in which it is possible to receive the processed pixel data, and a state in which it is possible to receive the processed pixel data is indicated (an output of input data is requested) by setting the data request signal to be output to the image processing module 33-2 to the "High" level will be described.

At this time, the image processing module 33-2 is in a state in which the processed pixel data corresponding to third and fourth unit lines is temporarily stored (a state in which there is no free storage capacity) in the input buffer 331-2. Thus, the control section 334-2 controls the input buffer 331-2 and the selector 332-2 so that the processed pixel data corresponding to the third unit line stored in the input buffer 331-2 is first read from the input buffer 331-2 and output to the arithmetic section 333-2. Thereby, the input buffer 331-2 outputs the processed pixel data corresponding to the stored third unit line to the selector 332-2, and the selector 332-2 outputs the processed pixel data corresponding to the third unit line input from the input buffer 331-2 to the arithmetic section 333-2. Then, the arithmetic section 333-2 performs an arithmetic operation of image processing on the processed pixel data corresponding to the third unit line output from the selector 332-2 and outputs the processed pixel data delayed by latency in the arithmetic section 333-2 to the image processing module 33-3 of the subsequent stage.

Thereby, as in the example of the operation of the image processing module 33 shown in FIG. 4, the input buffer 331-2 outputs the processed pixel data corresponding to the third unit line, so that a storage capacity for one unit line is free (remains) and the image processing module 33-2 can be in a state in which it is possible to receive the processed pixel data from the image processing module 33-1. At this time, in an example of the operation of the image processing module 33 shown in FIG. 4, the control section 334-2 sets the data request signal to be output to the image processing module 33-1 to the "High" level so as to indicate that the image processing module 33-2 is in a state in which it is possible to receive the processed pixel data. However, in one example of the operation of the image processing module 33 shown in FIG. 8, the control section 334 maintains the "Low" level state without setting the data request signal to the "High" level. That is, the image processing module 33-2 defers the change in the data request signal to the "High" level so as to intentionally maintain the state in which the processed pixel data from the image processing module 33-1 cannot be received. This is because the image processing module 33-2 is in a state in which all pixel data of each of unit lines temporarily stored in the input buffer 331-2 has been read and the entire storage capacity of the input buffer 331-2 is free due to outputting the processed pixel data corresponding to the fourth unit line temporarily stored in the input buffer 331-2.

Then, the control section 334-2 controls the input buffer 331-2 and the selector 332-2 so that the processed pixel data corresponding to the fourth unit line stored in the input buffer 331-2 is read from the input buffer 331-2 and output to the arithmetic section 333-2. Thereby, the processed pixel data corresponding to the fourth unit line stored in the input buffer 331-2 is input to the arithmetic section 333-2 via the selector 332-2. Then, the arithmetic section 333-2 outputs the processed pixel data generated by performing the arithmetic operation of image processing on the processed pixel data corresponding to the fourth unit line input via the selector 332-2 to the image processing module 33-3.

The input buffer 331-2 outputs the processed pixel data corresponding to the fourth unit line, so that the entire storage capacity is in the free state. In other words, the image processing module 33-2 is in a state in which it is possible to receive the processed pixel data from the image processing module 33-1 and directly transfer the received the processed pixel data to the arithmetic section 333-2 without temporarily storing the processed pixel data in the input buffer 331-2. Here, in order to indicate that the image processing module 33-2 is in a state in which it is possible to receive the processed pixel data, the control section 334-2 outputs the data request signal to be output to the image processing module 33-1 to the "High" level.

Also, the control section 334-2 controls the selector 332-2 so that the processed pixel data of each of the unit lines input subsequently from the image processing module 33-1 is output to the arithmetic section 333-2 as it is. Further, the control section 334-2 performs control so that the operation of the input buffer 331-2 is stopped and reduces the power consumption of the input buffer 331-2.

In the image processing module 33-1, when the data request signal input from the image processing module 33-2 of the subsequent stage has the "High" level and a notification indicating that the image processing module 33-2 is in a state in which it is possible to receive the processed pixel data is provided, the control section 334-1 outputs the processed pixel data corresponding to the fifth and the sixth unit lines to the image processing module 33-2 as in the control section 334-2 provided in the image processing module 33-2. More specifically, the control section 334-1 controls the input buffer 331-2 and the selector 332-2 so that the pixel data of each of the fifth and sixth unit lines stored in the input buffer 331-1 are sequentially read and output to the arithmetic section 333-1. Thereby, the arithmetic section 333-1 performs the arithmetic operation of image processing on the pixel data of each of the fifth and sixth unit lines sequentially input via the selector 332-1 and outputs the processed pixel data delayed by latency in the arithmetic section 333-1 to the image processing module 33-2 of the subsequent stage. At this time, similar to the control section 334-2 provided in the image processing module 33-2, the control section 334-1 also sets the data request signal to the "High" level after the reading of the pixel data of each of the sixth unit lines is completed without setting the data request signal to the "High" level after the pixel data of each of the fifth unit line is read, that is, when the entire storage capacity of the input buffer 331-1 is free. That is, the image processing module 33-1 also does not provide a notification indicating a state in which it is possible to receive pixel data immediately when it is possible to receive pixel data from the input DMA module 32, but provides a notification indicating a state in which it is possible to receive pixel data when the received pixel data can be directly transferred to the arithmetic section 333-1 without being temporarily stored in the input buffer 331-1.

Similar to the control section 334-2 provided in the image processing module 33-2, the control section 334-1 controls the selector 332-1 so that the pixel data of each of the unit lines input subsequently from the input DMA module 32 is output to the arithmetic section 333-1 as it is. Further, similar to the control section 334-2 provided in the image processing module 33-2, the control section 334-1 performing control so that an operation of the input buffer 331-1 is stopped and reduces the power consumption of the input buffer 331-1.

When a notification indicating that the image processing module 33-2 can be in a state in which it is possible to receive the processed pixel data is provided according to the data request signal input from the image processing module 33-1 of the subsequent stage, the input DMA module 32 resumes the reading of pixel data from the seventh unit line stored in the DRAM 20, and outputs the read pixel data to the image processing module 33-1. If pixel data of each of seventh and eighth unit lines is stored in the data buffer when the input DMA module 32 defers the reading of pixel data stored in the DRAM 20, reading of the pixel data may be resumed from the ninth unit line after the pixel data of each of the seventh and eighth unit lines stored in the data buffer is output to the image processing module 33-1.

In this manner, in the image processing section 30, if the data request signal input from the processing module of the subsequent stage connected to the pipeline is changed to a state in which it is possible to receive pixel data again, each processing module resumes the output of the output data to the processing module of the subsequent stage. At this time, each processing module sequentially outputs from the pixel data stored in the input buffer 331 provided in the processing module itself to the processing module of the subsequent stage. Each processing module provides a notification indicating that the processing module itself is in a state in which it is possible to receive pixel data after the storage capacity of the input buffer 331 provided in the processing module itself becomes entirely free. Then, each processing module sequentially outputs the input pixel data to the processing module of the subsequent stages without temporarily storing the input pixel data in the input buffer 331 provided in the processing module itself. Also, each processing module performs control so that the operation of the input buffer 331 provided in the processing module itself is stopped and reduces the power consumption of the input buffer 331.

Thereafter, by repeating the above-described operation, the image processing section 30 performs a series of image processing on block image data by sequentially performing the pipeline processing on pixel data included in the block image data for each unit line in each processing module connected to the pipeline.

In the example of the timing chart of the operation of the image processing module 33 of the first configuration shown in FIG. 8, a case in which a notification indicating that each processing module is in a state in which it is possible to receive pixel data after the storage capacity of the input buffer 331 provided in the processing module itself becomes entirely free is provided has been described. In the example of the timing chart of the operation of the image processing module 33 of the first configuration shown in FIG. 8, a case in which the pixel data input to each processing module is sequentially output to the processing module of the subsequent stage without being temporarily stored in the input buffer 331 and power consumption is reduced by stopping the operation of the input buffer 331 has been described. However, if the input buffer 331 provided in each processing module itself has a storage capacity capable of storing pixel data for many unit lines, much time is assumed to be required until the pipeline processing is completed if it is notified that the pixel data can be received after the storage capacity of the input buffer 331 provided in each processing module itself becomes entirely in a free state. Accordingly, the control section 334 provided in each processing module may determine whether or not to perform control so that the input pixel data is read and transferred to the arithmetic section 333 after being temporarily stored in the input buffer 331 on the basis of the number of unit lines temporarily stored in the input buffer 331 or whether or not to perform control so that the input pixel data is transferred to the arithmetic section 333 as it is without being temporarily stored in the input buffer 331.

More specifically, when a notification indicating that the processing module of the subsequent stage is in a state in which it is possible to receive pixel data can be provided, a predetermined threshold value of the number of unit lines may be compared with the number of unit lines indicated by the in-buffer data amount information on the basis of the number of unit lines capable of being temporarily stored by the input buffer 331, and an operation of the input buffer 331 may be switched according to a comparison result. For example, a case in which the input buffer 331 has a storage capacity capable of storing pixel data for 10 unit lines and the predetermined threshold value of the number of unit lines is "5" may be considered. In this case, if the number of unit lines indicated by the in-buffer data amount information is "5" or less when a notification indicating that the processing module of the subsequent stage is in state in which it is possible to receive pixel data, control is performed so that subsequently input pixel data is transferred to the arithmetic section 333 without being temporarily stored in the input buffer 331, that is, control is performed as in the example of the operation of the image processing module 33 shown in FIG. 8. On the other hand, if the number of unit lines indicated by the in-buffer data amount information is larger than "5" when a notification indicating that the processing module of the subsequent stage is in state in which it is possible to receive pixel data, control is performed so that subsequently input pixel data is transferred to the arithmetic section 333 is read after being temporarily stored in the input buffer 331, that is, control is performed as in the example of the operation of the image processing module 33 shown in FIG. 4. Thereby, the image processing section 30 can switch between control in which the reduction of the power consumption of the input buffer 331 provided in each processing module is prioritized and control in which the reduction of the processing time required for the pipeline processing is prioritized.

According to the first configuration of the first embodiment, the image processing device (the image processing device 1) in which the control section (the control section 334) defers an output of the data request signal for requesting the output of the pixel data or the processed pixel data to the processing module (the image processing module 33) of the previous stage until a state in which the pixel data or the processed pixel data is not stored in all the storage capacity of the data buffer (the input buffer 331) is reached, and after the state in which the pixel data or the processed pixel data is not stored in all the storage capacity of the input buffer 331 is reached, the control section 334 outputs the data request signal to the image processing module 33 of the previous stage, selects the path along which the pixel data or the processed pixel data is transferred by bypassing the input buffer 331, and causes the operation of the input buffer 331 to stop is configured.

As described above, the image processing module 33 of the first configuration intentionally performs control so that the input data bypasses the input buffer 331 and is transferred to the arithmetic section 333, by controlling a timing at which the processing module connected to the previous stage in the pipeline configuration is requested to provide input data, on the basis of a state of there being free storage capacity in the input buffer 331. Thus, in the image processing module 33 of the first configuration, it is possible to reduce power consumption of the input buffer 331 by stopping the operation of the input buffer 331 at that time. Thus, in the image processing section 30 constituting the pipeline in the image processing module 33 of the first configuration, it is possible to reduce the power consumption in pipeline processing without deteriorating the performance of pipeline processing when desired image processing is performed.

Also, in the image processing module 33 of the first configuration, a configuration for controlling the temporary storage (writing) of the input data input from the processing module of the previous stage in the input buffer 331 is shown. That is, in the image processing module 33 of the first configuration, the configuration of the processing module in which the data buffer (the input buffer 331) is provided at the input side when the arithmetic operation of image processing is performed is shown. However, the configuration of each processing module that performs the pipeline processing is not limited to the configuration in which the data buffer is provided at the input side as described above, and may be a configuration in which the data buffer is provided at an output side when the arithmetic operation of image processing is performed.

(Second Configuration)

Figure 9:
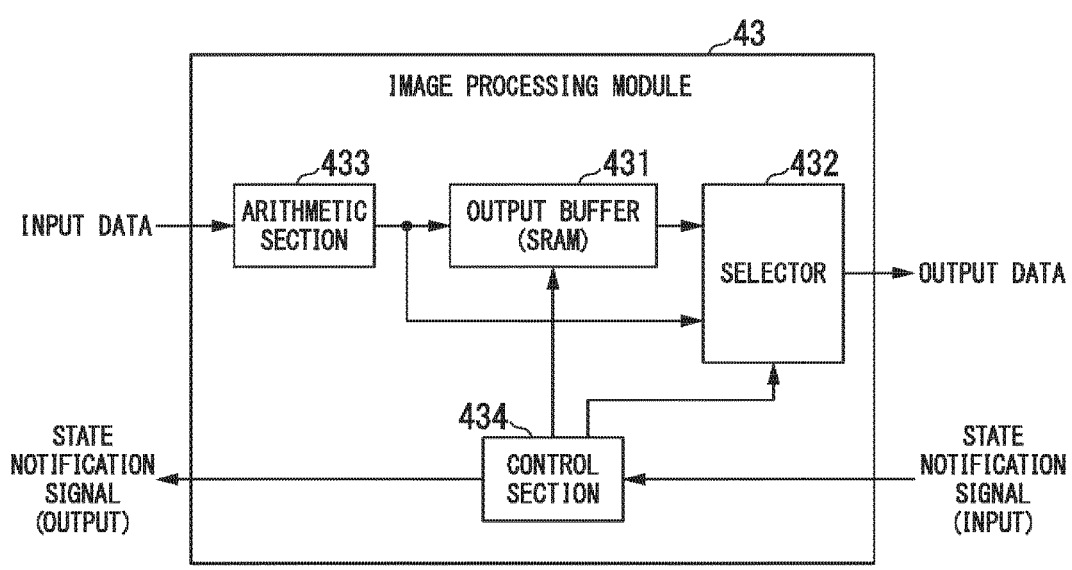
FIG. 9 is a block diagram showing a schematic configuration of the image processing module in the image processing section provided in the image processing device of the first embodiment of the present invention.

Next, the second configuration of each processing module provided in the image processing section 30 will be described. FIG. 9 is a block diagram showing a schematic configuration of the image processing module in the image processing section 30 provided in the image processing device 1 of the first embodiment of the present invention. In FIG. 9, a basic configuration of an image processing module (hereinafter referred to as an "image processing module 43") of the second configuration having a data buffer at the output side is shown. The image processing module 43 of the second configuration shown in FIG. 9 includes an arithmetic section 433, an output buffer 431, a selector 432, and a control section 434. Similar to the image processing module 33 of the first configuration, the image processing module 43 is a component element that performs pipeline processing in the image processing section 30.

Similar to the arithmetic section 333 provided in the image processing module 33 of the first configuration, the arithmetic section 433 performs an arithmetic operation of various predetermined digital image processing on the input pixel data. The arithmetic section 433 outputs the processed pixel data generated by performing the arithmetic operation of image processing to the output buffer 431 and the selector 432 as output data.

The output buffer 431 is a data buffer that temporarily stores the processed pixel data input from the arithmetic section 433. Similar to the input buffer 331 provided in the image processing module 33 of the first configuration, the output buffer 431 is constituted of, for example, a memory such as SRAM. The output buffer 431 has a storage capacity capable of storing the processed pixel data for a predetermined number of unit lines input from the arithmetic section 433 as output data. The output buffer 431 temporarily stores the input the processed pixel data, in accordance with a control signal input from the control section 434.

Similar to the input buffer 331 provided in the image processing module 33 of the first configuration, the output buffer 431 may also be constituted of a so-called double buffer which includes two storage capacity sets storing the processed pixel data (output data) for a predetermined number of unit lines input from the arithmetic section 433 and in which switching is alternately performed between writing of the processed pixel data to one storage capacity set and reading of the processed pixel data from the other storage capacity set.

The selector 432 is a selection unit that selects the processed pixel data to be output outside the image processing module 43 as output data. A configuration of the selector 432 is similar to that of the selector 332 provided in the image processing module 33 of the first configuration. In accordance with the control signal input from the control section 434, the selector 432 outputs either output data (the processed pixel data) temporarily stored in the output buffer 431 or output data (the processed pixel data) currently output from the arithmetic section 433, outside the image processing module 43. That is, the selector 432 outputs either the processed pixel data output from the arithmetic section 433 and temporarily stored in the output buffer 431 or intact the processed pixel data currently output from the arithmetic section 433, to the other image processing module 43 or the output DMA module 34 via the connection switching section 31.

Similar to the control section 334 provided in the image processing module 33 of the first configuration, the control section 434 performs the notification of the operation state of the image processing module 43 and the control of each component element included in the image processing module 43. The control section 434 outputs a state notification signal indicating the operation state of the image processing module 43 to the processing module of the previous stage. Also, the control section 434 controls the operation of the output buffer 431 according to whether or not there is free storage capacity in the output buffer 431.

More specifically, if there is free storage capacity in the output buffer 431, the output buffer 431 is in a state in which it is possible to temporarily store the processed pixel data output from the arithmetic section 433. In this case, the control section 434 outputs a signal for requesting the output of pixel data (a data request signal) to the processing module of the previous stage as a state notification signal indicating a state in which it is possible to receive the input data from the processing module of the previous stage. Then, the control section 434 controls the output buffer 431 so that the processed pixel data generated by the arithmetic section 433 performing an arithmetic operation of image processing on the input data input from the processing module of the previous stage is temporarily stored (written), in accordance with the state notification signal for requesting the output of the output pixel data.

Also, if there is no free storage capacity in the output buffer 431, the output buffer 431 is in a state in which it is not possible to temporarily store the processed pixel data output from the arithmetic section 433. In this case, the control section 434 outputs a signal indicating that the output of pixel data is not requested (a data request signal of a logic level indicating that the output of pixel data is not requested) to the processing module of the previous stage, as the state notification signal indicating a state in which it is not possible to receive the input data from the processing module of the previous stage. Also, at this time, the state notification signal may be a pipeline stall signal as in the control section 334 provided in the image processing module 33 of the first configuration.

Also, the control section 434 controls an operation of reading the processed pixel data temporarily stored in the output buffer 431, and selection (switching) of the processed pixel data (output data) to be output outside the image processing module 43 by the selector 432. In the control section 434, the control of the operation of reading the processed pixel data from the output buffer 431 and control of switching of the selector 432 are performed on the basis of a result of determining whether or not there is free storage capacity in the output buffer 431 and the state notification signal input from the processing module of the subsequent stage, as in the control section 334 provided in the image processing module 33 of the first configuration. Also, the state notification signal input from the processing module of the subsequent stage is the state notification signal output from the control section 434 provided in the processing module of the subsequent stage which is the output destination of the processed pixel data selected and output by the selector 432, and includes a signal indicating whether or not the processing module of the subsequent stage is in a state in which it is possible to receive the processed pixel data, that is, a signal indicating whether or not to request an output of the processed pixel data, and the like, as described above.

If the state notification signal input from the processing module of the subsequent stage indicates that it is possible to receive the processed pixel data, the control section 434 controls the selector 432 according to whether or not there is free storage capacity in the output buffer 431, and causes either the processed pixel data temporarily stored in the output buffer 431 or the processed pixel data currently output from the arithmetic section 433 to be output as output data outside the image processing module 43. That is, similar to the control section 334 provided in the image processing module 33 of the first configuration, the control section 434 performs control of the operation of the output buffer 431 and control of switching of the selector 432 according to whether or not the pipeline processing is smoothly performed without delaying the flow of the processed pixel data.

More specifically, if the storage capacity of the output buffer 431 is entirely not free, the processed pixel data for at least one unit line is temporarily stored in the output buffer 431. In this case, the control section 434 controls the output buffer 431 so that the temporarily stored the processed pixel data is read, and controls the selector 432 so that the processed pixel data output from the output buffer 431 is externally output. Thereby, the selector 432 outputs the processed pixel data that is read after being temporarily stored in the output buffer 431 to the image processing module 43 of the subsequent stage. At this time, if the input data according to the state notification signal for requesting the output of the output pixel data is input from the processing module of the previous stage, the control section 434 controls the output buffer 431 so that the processed pixel data generated by the arithmetic section 433 performing an arithmetic operation of image processing on the input data is temporarily stored (written) in the free storage capacity.

Also, when the storage capacity of the output buffer 431 is entirely free, no the processed pixel data for any unit line is temporarily stored in the output buffer 431. In this case, the control section 434 controls the output buffer 431 so that the operation is stopped. Thereby, the image processing module 43 can reduce power consumption of the output buffer 431. Then, the control section 434 controls the selector 432 so that the processed pixel data currently output from the arithmetic section 433 is output as it is, that is, the processed pixel data generated by performing the arithmetic operation of image processing on the currently input pixel data in the arithmetic section 433 is directly externally output without being temporarily stored in the output buffer 431. Thereby, the arithmetic section 433 outputs the processed pixel data generated by performing the arithmetic operation of image processing on the input data (pixel data) currently input to the image processing module 43 to the image processing module 43 of the subsequent stage.

On the other hand, if the state notification signal input from the processing module of the subsequent stage indicates that it is not possible to receive the processed pixel data and there is free storage capacity of the output buffer 431, the control section 434 controls the output buffer 431 so that the processed pixel data generated by the arithmetic section 433 performing an arithmetic operation of image processing on the input data input to the image processing module 43 is temporarily stored (written) in the free storage capacity.

Also, if the state notification signal input from the processing module of the subsequent stage indicates that it is not possible to receive the processed pixel data and there is no free storage capacity in the output buffer 431, no input data is input from the processing module of the previous stage because the control section 434 outputs the state notification signal indicating that it is not possible to receive the input data to the processing module of the previous stage. Therefore, the control section 434 does not control the operation of the output buffer 431.

With such a configuration, each of the processing modules of the second configuration provided in the image processing section 30 performs reception of the input data from the processing module of the previous stage and selection (switching) of the processed pixel data to be externally output on the basis of the state of there being free storage capacity in the output buffer 431.

Figure 10:
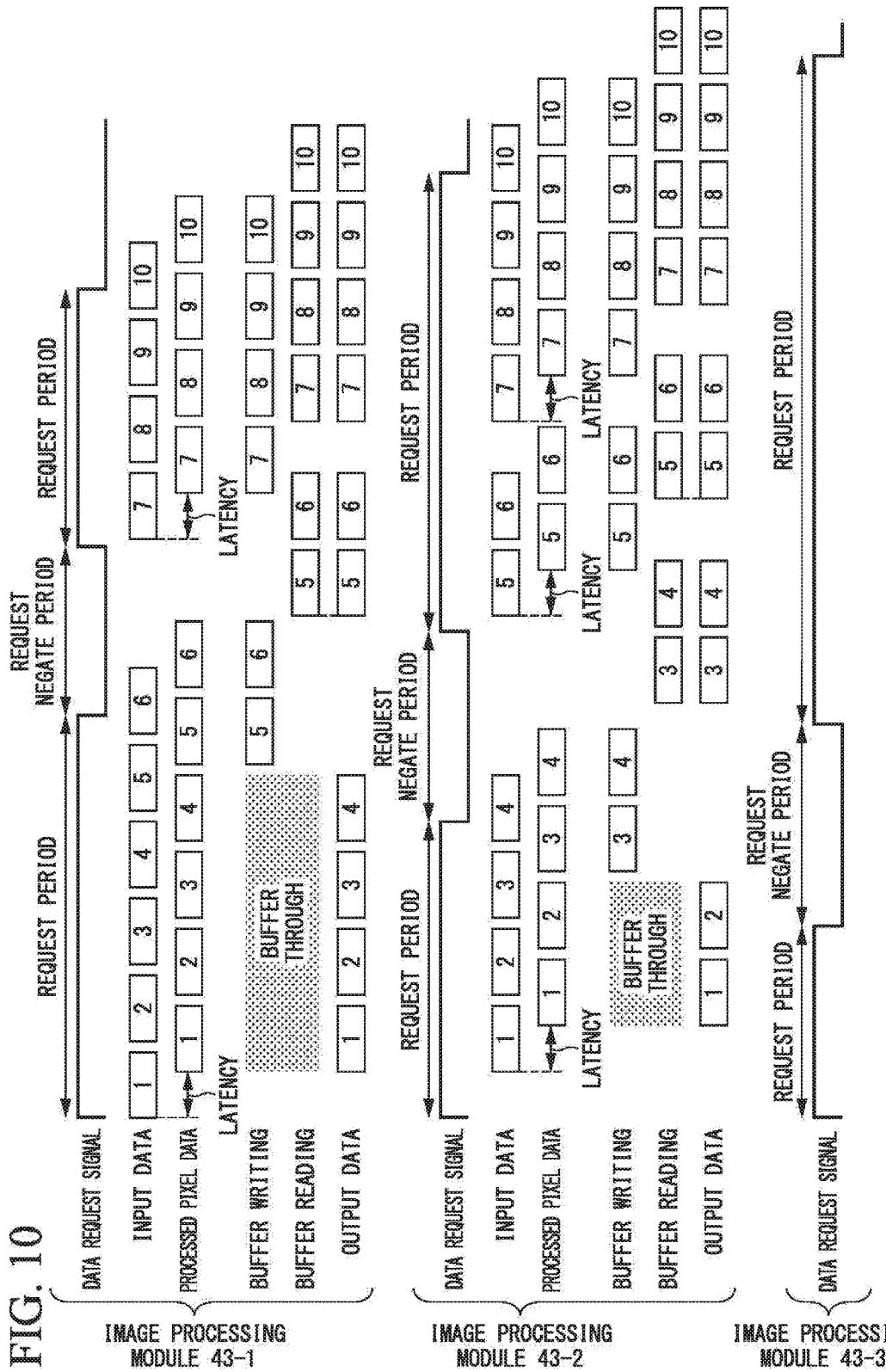
FIG. 10 is a timing chart showing an example of an operation of the image processing module in the image processing section provided in the image processing device of the first embodiment of the present invention.

Next, the operation of each processing module of the second configuration provided in the image processing section 30 will be described. FIG. 10 is a timing chart showing an example of an operation of the image processing module 43 in the image processing section 30 provided in the image processing device 1 of the first embodiment of the present invention. In FIG. 10, an in the example of the operation of the image processing module 33 of the first configuration shown in FIG. 4, an example of delivery of the processed pixel data from an image processing module 43-1 to an image processing module 43-2 when the image processing section 30 performs the pipeline processing according to a configuration in which the input DMA module 32, the image processing modules 43-1 to 43-3 of the second configuration, and the output DMA module 34 are connected in series (a pipeline connection) is shown.

In FIG. 10, input data to be input, the processed pixel data output by performing an arithmetic operation of image processing in the arithmetic section 433, buffer writing indicating writing of the processed pixel data to the output buffer 431, buffer reading indicating reading of the processed pixel data from the output buffer 431, and output data to be output are shown with respect to each of the image processing module 43-1 and the image processing module 43-2. Also, in FIG. 10, the data request signal for requesting the output of input data is shown as the state notification signal to be output by each of the image processing module 43-1 and the image processing module 43-2 to the processing module of the previous stage. Also, in FIG. 10, the data request signal output as the state notification signal by the image processing module 43-3 connected to the subsequent stage of the image processing module 43-2 is also shown.

Also, in the description of FIG. 10, as in the example of the operation of the image processing module 33 of the first configuration shown in FIG. 4, it is assumed that image processing is performed using one unit line as one unit of processing and numbers indicating the number of the unit lines are shown with respect to the input data, the processed pixel data, the buffer writing, the buffer reading, and the output data. Also, in the description of FIG. 10, as in the example of operation of the image processing module 33 of the first configuration shown in FIG. 4, it is assumed that each processing module provided in the image processing section 30 includes a data buffer of a capacity capable of storing pixel data for two unit lines. Also, in the description of FIG. 10, as in the example of the operation of the image processing module 33 of the first configuration shown in FIG. 4, in order to distinguish between the respective component elements provided in each the image processing module 43, the component element is indicated by adding "-" given to the image processing module 43 and a numeral portion subsequent to "-", subsequently to a reference numeral assigned to each component element. For example, the control section 434 provided in the image processing module 43-1 is represented as a "control section 434-1" and the control section 434 provided in the image processing module 43-2 is represented as a "control section 434-2".

When the image processing section 30 starts the pipeline processing, each of the image processing module 43-1, the image processing module 43-2, the image processing module 43-3, and the output DMA module 34 outputs the data request signal for requesting an output of input data to the processing module of the previous stage. This is because, as in the example of the operation of the image processing module 33 of the first configuration shown in FIG. 4, the storage capacity of the output buffer 431 provided in each image processing module 43 is entirely free in a first step in which the image processing section 30 starts the pipeline processing and therefore it is possible to temporarily store the processed pixel data and receive the input data. That is, this is because the arithmetic section 433-1 provided in the image processing module 43-1 and the arithmetic section 433-2 provided in the image processing module 43-2 are in a state in which image processing on the input pixel data can be immediately performed. Also, as in an example of the operation of the image processing module 33 of the first configuration shown in FIG. 4, in the first step in which the image processing section 30 starts the pipeline processing, the output DMA module 34 is also in a state in which the input data (the processed pixel data), which has been input can be immediately output to the DRAM 20 via the DMA bus 10.

Also in FIG. 10, as in the example of the operation of the image processing module 33 of the first configuration shown in FIG. 4, a period during which the data request signal has a "High" level represents a request period during which each processing module is in a state in which it is possible to receive pixel data and a period during which the data request signal has a "Low" level represents a request negate period during which each processing module is in a state in which it is not possible to receive pixel data.

When the data request signal is input from the image processing module 43-1 of the subsequent stage, the input DMA module 32 first sequentially reads pixel data of the first unit line stored in the DRAM 20 via the DMA bus 10 for each unit line. Then, the input DMA module 32 outputs the read pixel data to the image processing module 43-1. At this time, the image processing module 43-1 connected to the subsequent stage of the input DMA module 32 is indicated to be in a state in which it is possible to receive the pixel data, by outputting the data request signal of the "High" level. Thus, the input DMA module 32 outputs the read pixel data to the image processing module 43-1 as it is, without temporarily storing the read pixel data in the data buffer. At this time, the input DMA module 32 stops the operation of the data buffer and reduces the power consumption of the data buffer. Thereafter, the input DMA module 32 reads pixel data of the second unit line stored in the DRAM 20 and starts an output to the image processing module 43-1.

Also, when the data request signal is input from the image processing module 43-2 of the subsequent stage, the image processing module 43-1 performs image processing on pixel data of the first unit line input from the input DMA module 32. At this time, as described above, the image processing module 43-1 is in a state in which the storage capacity of the output buffer 431-1 is entirely free, and is in a state in which the arithmetic section 433-1 can immediately performs the image processing on the input pixel data. Also, at this time, the image processing module 43-2 connected to the subsequent stage of the image processing module 43-1 is indicated to be in a state in which it is possible to receive the processed pixel data, by outputting the data request signal of the "High" level. Thus, the control section 434-1 controls the selector 432-1 so that the processed pixel data generated by the arithmetic section 433-1, performing an arithmetic operation of image processing on pixel data of the first unit line currently input from the input DMA module 32 of the previous stage is externally output as output data at it is. Also, the control section 434-1 performs control so that the operation of the output buffer 431-1 is stopped and reduces the power consumption of the output buffer 431-1. Thereby, the selector 432-1 outputs the processed pixel data output from the arithmetic section 433-1 as the output data to the image processing module 43-2 of the subsequent stage as it is. Also, the output data (the processed pixel data) output from the image processing module 43-1 is output after being delayed by a delay time (latency) caused by performing the arithmetic operation of image processing in the arithmetic section 433-1. Thereafter, the image processing module 43-1 starts the image processing on the pixel data of the second unit line input from the input DMA module 32.

Also, when the data request signal is input from the image processing module 43-3 of the subsequent stage, the image processing module 43-2 performs image processing on the processed pixel data corresponding to the first unit line input from the image processing module 43-1. At this time, as described above, the image processing module 43-2 is also in a state in which the storage capacity of the output buffer 431-2 is entirely free, and is in a state in which the arithmetic section 433-2 can immediately perform the image processing on the input the processed pixel data. Also, at this time, the image processing module 43-3 connected to the subsequent stage of the image processing module 43-2 is also indicated to be in a state in which it is possible to receive the processed pixel data, by outputting the data request signal of the "High" level. Thus, the control section 434-2 controls the selector 432-2 so that the processed pixel data generated by the arithmetic section 433-2, performing an arithmetic operation of image processing on pixel data of the first unit line currently input from the image processing module 43-1 of the previous stage is externally output as output data at it is. Also, the control section 434-2 performs control so that the operation of the output buffer 431-2 is stopped and reduces the power consumption of the output buffer 431-2. Thereby, the selector 432-2 outputs the processed pixel data delayed by latency in the arithmetic section 433-2 and output from the arithmetic section 433-2 as the output data to the image processing module 43-3 of the subsequent stage as it is. Thereafter, the image processing module 43-2 also starts the image processing on the processed pixel data corresponding to the second unit line input from the image processing module 43-1.

In this manner, in the image processing section 30, each processing module of the second configuration sequentially delivers input data, which has been input, to the processing module of the subsequent stage connected to the pipeline. At this time, because each processing module of the second configuration is in a state in which the storage capacity of the output buffer 431 provided in the processing module itself is entirely free and the processing module of the subsequent stage is in a state in which it is possible to receive the input data, the input data input from the processing module of the previous stage as it is or by immediately performing an arithmetic operation of image processing on input data and not temporarily storing it in the output buffer 431 outputs to the processing module of the subsequent stage. In FIG. 10, with respect to the buffer writing and buffer reading of each of the image processing module 43-1 and the image processing module 43-2, a period during which input data is not temporarily stored in the output buffer 431, that is, a period during which input data is externally output without involving the output buffer 431, is shown as a buffer through period.

Then, the image processing section 30 performs control so that each processing module of the second configuration stops the operation of the data buffer (the output buffer 431) provided in the processing module itself. That is, the image processing section 30 stops the operation of the data buffer (the output buffer 431) in the buffer through period in each processing module. Thereby, the image processing section 30 can reduce the power consumption of the data buffer (the output buffer 431) provided in each processing module.

Here, an operation when the image processing module 43-3 of the subsequent stage is in a state in which it is not possible to receive the processed pixel data due to any cause when the image processing module 43-2 outputs the processed pixel data corresponding to the second unit line will be described. In this case, the image processing module 43-3 indicates in a state in which it is not possible to receive the processed pixel data, that is, indicates that an output of input data is not requested, due to setting the data request signal to be output to the image processing module 33-2 to the "Low" level. Also, a method by which each processing module of the second configuration notifies the processing module of the previous stage that the output of the input data is not requested is not limited to the method based on the logic level of the data request signal as described above, and may be a method of providing a notification indicating that each processing module is in a state in which it is not possible to receive the pixel data by outputting the pipeline stall signal.

At this time, because the image processing module 43-2 is in a state in which the storage capacity of the output buffer 431-2 is entirely free (a state in which a storage capacity for two unit lines is free), the control section 434-2 controls the output buffer 431-2 so that the processed pixel data generated by the arithmetic section 433-2 performing an arithmetic operation of image processing on the processed pixel data corresponding to the third unit line currently input from the image processing module 43-1 of the previous stage is temporarily stored. Thereby, the output buffer 431-2 stores the processed pixel data generated by further performing an arithmetic operation of image processing on the processed pixel data corresponding to the third unit line, and is in a state in which the storage capacity for one unit line is free (remains).

Further, in the image processing module 43-2, the control section 434-2 controls the output buffer 431-2 so that the processed pixel data generated by the arithmetic section 433-2 performing an arithmetic operation of image processing on the processed pixel data corresponding to the fourth unit line currently input from the image processing module 33-1 of the previous stage is temporarily stored. Thereby, the output buffer 431-2 also stores the processed pixel data generated by further performing an arithmetic operation of image processing on the processed pixel data corresponding to the fourth unit line and is in a state in which there is no free storage capacity. In other words, the image processing module 43-2 is in a state in which it is not possible to receive the processed pixel data from the image processing module 43-1. Thus, in order to indicate that the image processing module 43-2 is in a state in which it is not possible to receive the processed pixel data, the control section 434-2 sets the data request signal to be output to the image processing module 43-1 to the "Low" level.

Thereby, in the image processing module 43-1, similar to the control section 434-2 provided in the image processing module 43-2, the control section 434-1 controls the output buffer 431-1 so that the processed pixel data generated by the arithmetic section 433-1 performing an arithmetic operation of image processing on pixel data of each of fifth and sixth unit lines input from the input DMA module 32 is temporarily stored. Thereby, the output buffer 431-1 stores the processed pixel data generated by performing the arithmetic operation of image processing on the pixel data of each of the fifth and sixth unit lines, and the image processing module 43-1 is in a state in which it is not possible to receive the pixel data from the input DMA module 32. Thus, similar to the control section 434-2, the control section 434-1 also sets the data request signal to be output to the input DMA module 32 to the "Low" level so as to indicate that the image processing module 43-1 is in a state in which it is not possible to receive the pixel data.

Thereby, the input DMA module 32 defers reading of pixel data of a seventh unit line stored in the DRAM 20. Because the input DMA module 32 also includes a data buffer of a capacity in which pixel data for two unit lines can be stored, the input DMA module 32 may read pixel data of each of seventh and eighth unit lines, temporarily store the read pixel data in the data buffer, and then defer reading of pixel data of a ninth unit line.

In this manner, in the image processing section 30, if the data request signal input from the processing module of the subsequent stage connected to the pipeline indicates a state in which it is not possible to receive pixel data, each processing module stops an output of the output data to the processing module of the subsequent stage. Each processing module provides a notification indicating that the processing module itself is in a state in which it is not possible to receive the pixel data after temporarily storing the processed pixel data in an amount according to the free storage capacity of the output buffer 431 provided in the processing module itself.

Also, in the image processing section 30, each processing module of the second configuration performs processing for each unit of processing. Accordingly, even when the image processing section 30 provides a notification indicating a state in which it is not possible to receive the pixel data while each processing module outputs the pixel data of one unit of processing to the processing module of the subsequent stage, an output of the output data to the processing module of the subsequent stage is stopped after all pixel data of a unit of processing which is currently being output is output.

Next, an operation when the image processing module 43-3 is in a state in which it is possible to receive the processed pixel data will be described. In this case, the image processing module 43-3 indicates in a state in which it is possible to receive the processed pixel data, that is, indicates that an output of input data is requested, due to setting the data request signal to be output to the image processing module 43-2 to the "High" level. Also, a method by which each processing module of the second configuration notifies the processing module of the previous stage that the output of the input data is requested again is not limited to the method based on the logic level of the data request signal as described above, and may be a method of providing a notification indicating that each processing module is in a state in which it is possible to receive the pixel data by stopping an output of the pipeline stall signal.

At this time, the image processing module 43-2 is in a state in which there is no free storage capacity in the output buffer 431-2 (a state in which the processed pixel data generated by the arithmetic section 433-2 performing an arithmetic operation of image processing on the processed pixel data corresponding to the third and fourth unit lines is temporarily stored). Thus, the control section 434-2 controls the output buffer 431-2 and the selector 432-2 so that the processed pixel data generated by further performing the arithmetic operation of image processing on the processed pixel data corresponding to the third unit line stored in the output buffer 431-2 is first read from the output buffer 431-2 and externally output. Thereby, the output buffer 431-2 outputs the processed pixel data generated by further performing the arithmetic operation of image processing on the processed pixel data corresponding to the stored third unit line to the selector 432-2, and the selector 432-2 externally outputs the processed pixel data generated by further performing the arithmetic operation of image processing on the processed pixel data corresponding to the third unit line input from the output buffer 431-2 as output data. Also, because the processed pixel data stored in the output buffer 431-2 by the image processing module 43-2 is the processed pixel data generated by previously performing the arithmetic operation of image processing in the arithmetic section 433-2, the processed pixel data can be output to the image processing module 43-3 of the subsequent stage without being delayed by latency in the arithmetic section 433-2.

Also, the output buffer 431-2 outputs the processed pixel data generated by further performing the arithmetic operation of image processing on the processed pixel data corresponding to the third unit line, so that a state in which the storage capacity for one unit line is free (remains). That is, the image processing module 43-2 is in a state in which it is possible to receive the processed pixel data from the image processing module 43-1. Thus, in order to indicate that the image processing module 43-2 is in a state in which it is possible to receive the processed pixel data, the control section 434-2 sets the data request signal to be output to the image processing module 43-1 to the "High" level.

Further, in the image processing module 43-2, there is free storage capacity in the output buffer 431-2, but the processed pixel data corresponding to the fourth unit line is temporarily stored. Thus, the control section 434-2 controls the output buffer 431-2 and the selector 432-2 so that the processed pixel data generated by further performing the arithmetic operation of image processing on the processed pixel data corresponding to the fourth unit line stored in the output buffer 431-2 is read from the output buffer 431-2 and externally output. Thereby, the output buffer 431-2 outputs the processed pixel data generated by further performing the arithmetic operation of image processing on the processed pixel data corresponding to the stored fourth unit line as the output data to the image processing module 43-3.

Also, in the image processing module 43-1, when the data request signal input from the image processing module 43-2 of the subsequent stage has the "High" level and a notification indicating that the image processing module 43-2 is in a state in which it is possible to receive the processed pixel data is provided, the control section 434-1 outputs the processed pixel data corresponding to the fifth and the sixth unit lines to the image processing module 43-2 as in the control section 434-2 provided in the image processing module 43-2. More specifically, the control section 434-1 controls the output buffer 431-2 and the selector 432-2 so that the processed pixel data generated by performing the arithmetic operation of image processing on the pixel data of each of the fifth and sixth unit lines stored in the output buffer 431-1 are sequentially read and externally output. Thereby, the output buffer 431-1 outputs the processed pixel data generated by performing the arithmetic operation of image processing on the pixel data of the stored fifth and sixth unit line as the output data to the image processing module 43-2 of the subsequent stage. Also, because the processed pixel data stored in the output buffer 431-1 by the image processing module 43-1 is the processed pixel data generated by previously performing the arithmetic operation of image processing in the arithmetic section 433-1, the processed pixel data can be output to the image processing module 43-2 of the subsequent stage without being delayed by latency in the arithmetic section 433-1.

Also, when the processed pixel data generated by performing the arithmetic operation of image processing on the pixel data of the fifth unit line is output, the output buffer 431-1 is in a state in which the storage capacity of one unit line is free (remains), and the image processing module 43-1 is in a state in which it is possible to receive pixel data from the input DMA module 32. Thus, similar to the control section 434-2, the control section 434-1 sets the data request signal to be output to the input DMA module 32 to the "High" level so as to indicate that the image processing module 43-1 is in a state in which it is possible to receive pixel data.

Thereby, the input DMA module 32 resumes the reading of the pixel data from the seventh unit line stored in the DRAM 20, and outputs the read pixel data to the image processing module 43-1. If the input DMA module 32 stores the pixel data of each of the seventh and eighth unit lines in the data buffer when the reading of the pixel data stored in the DRAM 20 is deferred, the reading of the pixel data may be resumed from the ninth unit line after the pixel data of the seventh unit line stored in the data buffer is output to the image processing module 43-1.

In this manner, in the image processing section 30, if the data request signal input from the processing module of the subsequent stage connected to the pipeline is changed to a state in which it is possible to receive pixel data again, each processing module of the second configuration resumes the output of the output data to the processing module of the subsequent stage. At this time, each processing module of the second configuration sequentially outputs from the pixel data stored in the output buffer 431 provided in the processing module itself to the processing module of the subsequent stage. Each processing module of the second configuration provides a notification indicating that the processing module itself is in a state in which it is possible to receive pixel data after storage capacity of the output buffer 431 provided in the processing module itself becomes free. Thereafter, each processing module of the second configuration temporarily stores the processed pixel data generated by performing an arithmetic operation of image processing on the input pixel data in the arithmetic section 433 provided in the processing module itself in the output buffer 431 provided in the processing module itself, reads the stored the processed pixel data, and sequentially outputs the read the processed pixel data to the processing module of the subsequent stage.

Thereafter, by repeating the above-described operation, the image processing section 30 performs a series of image processing on block image data by sequentially performing the pipeline processing on pixel data included in the block image data for each unit line in each processing module of the second configuration connected to the pipeline.

Although not shown in the example of the timing chart of the operation of the image processing module 43 shown in FIG. 10, if a state in which it is possible to output the processed pixel data generated by performing an arithmetic operation of image processing on input data to the processing module of the subsequent stage as it is without involving the output buffer 431 again is reached after the image processing section 30 resumes the output of the output data to the processing module of the subsequent stage by each processing module of the second configuration, control is performed to stop the operation of the output buffer 431 as in the first step of starting the pipeline processing shown in FIG. 10. Thereby, the image processing section 30 can reduce the power consumption of the output buffer 431 provided in each processing module of the second configuration.

As described above, the image processing module 43 of the second configuration requests the processing module connected to the previous stage in the pipeline configuration to provide input data on the basis of the state of there being free storage capacity in the output buffer 431, and controls temporary storage (writing) of the processed pixel data in the output buffer 431 after the arithmetic operation of image processing is performed on the input data (pixel data) input from the processing module of the previous stage. Also, the image processing module 43 of the second configuration controls reading of the processed pixel data temporarily stored in the output buffer 431 and selection (switching) of the processed pixel data to be output to the processing module of the subsequent stage, on the basis of the state of there being free storage capacity in the output buffer 431 and the operation state of the processing module connected to the subsequent stage in the pipeline configuration. Thereby, in the image processing module 43 of the second configuration can perform control so that the processed pixel data after the arithmetic section 433 performs the arithmetic operation of image processing on the input data input from the processing module of the previous stage bypasses the output buffer 431 and is output to the processing module of the subsequent stage, if the processing module of the subsequent stage is not in the pipeline stall state and the entire storage capacity of the output buffer 431 is free. Also, in the image processing module 43 of the second configuration, the processed pixel data after the arithmetic section 433 performs the arithmetic operation of image processing on the input data input from the processing module of the previous stage bypassing the output buffer 431 and is output to the processing module of the subsequent stage, so that it is possible to reduce power consumption of the output buffer 431 by stopping the operation of the output buffer 431 at that time. Thereby, even in the image processing section 30 constituting the pipeline in the image processing module 43 of the second configuration, it is possible to perform desired image processing even when writing of data to the data buffer and reading of data from the data buffer are not necessarily performed as when the pipeline is configured in the conventional processing module, and it is possible to reduce the power consumption in the pipeline processing without deteriorating the performance of the pipeline processing.

Also, a configuration, determination process, and operation of the control section 434 provided in the image processing module 43 can be considered to be similar to the configuration, determination process, and operation of the image processing module 33 of the first configuration shown in FIG. 5 to FIG. 7. Accordingly, a detailed description of the configuration, determination processing, and operation of the control section 434 provided in the image processing module 43 will be omitted. However, the image processing module 43 of the second configuration has a configuration in which the arithmetic section 433 first performs an arithmetic operation of image processing on the input data input from the processing module of the previous stage. Thus, in the image processing module 43 of the second configuration, a timing at which the arithmetic section 433 performs the arithmetic calculation of the image processing on the input data, a timing at which the control section 434 updates the in-buffer data amount information, a timing of the buffer writing signal for enabling the control section 434 to write the processed pixel data to the output buffer 431, and a timing of the data validity signal output by the image processing module 43 to the processing module of the subsequent stage are different from those of the image processing module 33 of the first configuration.

More specifically, the arithmetic section 433 performs the arithmetic operation of image processing on valid pixel data indicated by the data validity signal included in the unit line input from the processing module of the previous stage. Also, when the number of unit lines indicated by the in-buffer data amount information is updated by incrementing the number of unit lines by "1", the data amount management section provided in the control section 434 corresponding to the data amount management section 3341 provided in the control section 334 of the image processing module 33 of the first configuration updates the in-buffer data amount information by assuming that the data validity signal output from the arithmetic section 433 is the data validity signal input from the processing module of the previous stage in the image processing module 33 of the first configuration. The output buffer writing management section provided in the control section 434 corresponding to the input buffer writing management section 3343 provided in the control section 334 of the image processing module 33 of the first configuration generates the buffer writing signal for writing the processed pixel data to the output buffer 431 on the basis of the processed pixel data indicated to be valid by the data validity signal output from the arithmetic section 433 and outputs the generated buffer writing signal to the output buffer 431. Also, the selector 432 selects (switches) the data validity signal to be externally output so that the data validity signal corresponding to the selected (switched) the processed pixel data is output. That is, the selector 432 outputs the data validity signal output from the arithmetic section 433 when the arithmetic section 433 externally outputs the processed pixel data subjected to the arithmetic operation of image processing, and selects (switches) the data validity signal to be externally output so that the data validity signal according to a timing at which the processed pixel data is read from the output buffer 431 when the processed pixel data stored in the output buffer 431-1 is externally output. Also, the output buffer reading management section provided in the control section 434 corresponding to the input buffer reading management section 3344 provided in the control section 334 of the image processing module 33 of the first configuration may generate the data validity signal according to the timing at which the processed pixel data is read from the output buffer 431 and output the generated the data validity signal to the selector 432, or the selector 432 may generate the data validity signal on the basis of the buffer reading signal output from the control section 434 to the output buffer 431.

In the operation of the image processing module 43 of the second configuration described with reference to FIG. 10, after the processed pixel data generated by performing the arithmetic operation of image processing on the input data input from the processing module of the previous stage is controlled so that output to the processing module of the subsequent stage is read after being temporarily stored in the output buffer 431, control is not actively performed so that the processed pixel data generated by the arithmetic section 433 is externally output by bypassing the output buffer 431 again. That is, also in the operation of the image processing module 43 of the second configuration shown in FIG. 10, as in the operation of the image processing module 33 of the first configuration shown in FIG. 4 and FIG. 7, control for externally outputting so that the processed pixel data generated by performing the arithmetic operation of image processing in the arithmetic section 433 bypasses the output buffer 431 depends on the operation states of the processing module of the previous stage and the processing module of the subsequent stage. However, also in the image processing module 43 of the second configuration, as in the image processing module 33 of the first configuration, the control section 434 can intentionally perform control so that a state the processed pixel data generated by the arithmetic section 433 performing the arithmetic operation of image processing bypasses the output buffer 431 and output to externally. The operation at this time can be considered to be similar to the operation of the image processing module 33 of the first configuration shown in FIG. 8. Accordingly, a detailed description of an operation in which the image processing module 43 intentionally performs control so that a state the processed pixel data generated by the arithmetic section 433 performing the arithmetic operation of image processing bypasses the output buffer 431 and output to externally will be omitted.

As described above, in the image processing device 1 of the first embodiment, each processing module constituting the pipeline provided in the image processing section 30 requests the processing module connected to the previous stage to the input data and controls the temporary storage (writing) of data in the data buffer on the basis of a state of there being free storage capacity in the data buffer provided in each processing module. Also, in the image processing device 1 of the first embodiment, each processing module provided in the image processing section 30 controls reading of the data temporarily stored in the data buffer and selection (switching) of the output data to be externally output on the basis of the state of there being free storage capacity in the data buffer provided in each processing module and the operation state of the processing module connected to the subsequent stage. At this time, if the processing module of the subsequent stage is not in the pipeline stall state and is in a state in which the storage capacity of the data buffer is entirely free, each processing module performs control so that the data bypasses the data buffer and stops the operation of the data buffer. Thereby, it is possible to reduce power consumption of the data buffer in each processing module. At this time, the image processing section 30 can regard the processing module performing control so that the data bypasses the data buffer and the processing module of the stage subsequent thereto as one processing module. On the other hand, if the processing module of the subsequent stage is in the pipeline stall state, each processing module performs control so that the data does not bypass the data buffer. Thereby, it is possible to prevent each processing module itself from being in the pipeline stall state. Thereby, in the image processing device 1 of the first embodiment, it is possible to reduce the power consumption in the pipeline processing without deteriorating the performance of the pipeline processing when desired image processing is performed according to the pipeline processing by each processing module provided in the image processing section 30.

In the image processing device 1 of the first embodiment, a configuration in which each processing module constituting the pipeline provided in the image processing section 30 determines whether or not to cause the data to bypass the data buffer provided in each processing module on the basis of the operation state of an immediately subsequent processing module in the pipeline configuration has been described. However, whether or not to cause the data to bypass the data buffer in each processing module is not limited to a configuration in which a determination is performed according to the operation state of the immediately subsequent processing module described in the first embodiment. For example, each processing module may have a configuration in which it is determined whether or not to cause the data to bypass the data buffer provided in each processing module on the basis of operation states of a plurality of processing modules of the subsequent stages in the pipeline configuration or all the processing modules of the subsequent stages. More specifically, a configuration in which it is determined whether or not to cause the data to bypass the data buffer on the basis of a result of performing a logical product (AND) operation on the pipeline stall signals output from the plurality of processing modules of the subsequent stages may be adopted. In this case, each processing module can determine whether or not to cause the data to bypass the data buffer on the basis of a pipeline stall signal input by performing the logical product operation. That is, each processing module can determine to cause the data to bypass the data buffer if all the processing modules of the subsequent stages performing the logical product operation on the pipeline stall signals are not in the pipeline stall state. Also, if each processing module can also obtain information about the state of there being free storage capacity in the data buffer provided in the processing module of the subsequent stage as the state notification signal, it is possible to determine whether or not to cause the data to bypass the data buffer by regarding the storage capacity of the data buffer provided in the processing module of the subsequent stage as a part of the storage capacity of the data buffer provided in the processing module itself.

In the image processing device 1 of the first embodiment, for example, as shown in FIG. 7, a method of requesting the processing module of the previous stage to the input data after each processing module reads all data temporarily stored in the data buffer as a method of actively performing control so that the data bypasses the data buffer again after control is performed so that the data does not bypass the data buffer is shown. However, in each processing module the method of actively performing control so that the data bypasses the data buffer is not limited to the method described in the first embodiment. For example, if input data requests from a plurality of processing modules of subsequent stages are continuously output for a predetermined time or more, each processing module may perform control so that the data bypasses the data buffer.

In the image processing device 1 of the first embodiment, each processing module constituting the pipeline provided in the image processing section 30 determines whether or not to cause the data to bypass the data buffer, that is, determines whether or not to cause the data to bypass the data buffer for each processing module, on the basis of the pipeline stall state in the processing module of the subsequent stage. However, in consideration of the entire image processing device 1, a delay of the flow (bus traffic) of data in the DMA bus 10 is also considered to be a cause for the pipeline processing in the image processing section 30 to be in the pipeline stall state. This is because a plurality of component elements connected to the DMA bus 10 in the image processing device 1 exchange data for performing a process with the DRAM 20 via the DMA bus 10. Thus, it is desirable to consider the bus traffic in the DMA bus 10 so that the performance of the pipeline processing in the image processing section 30 is not deteriorated.

Second Embodiment

Figure 11:
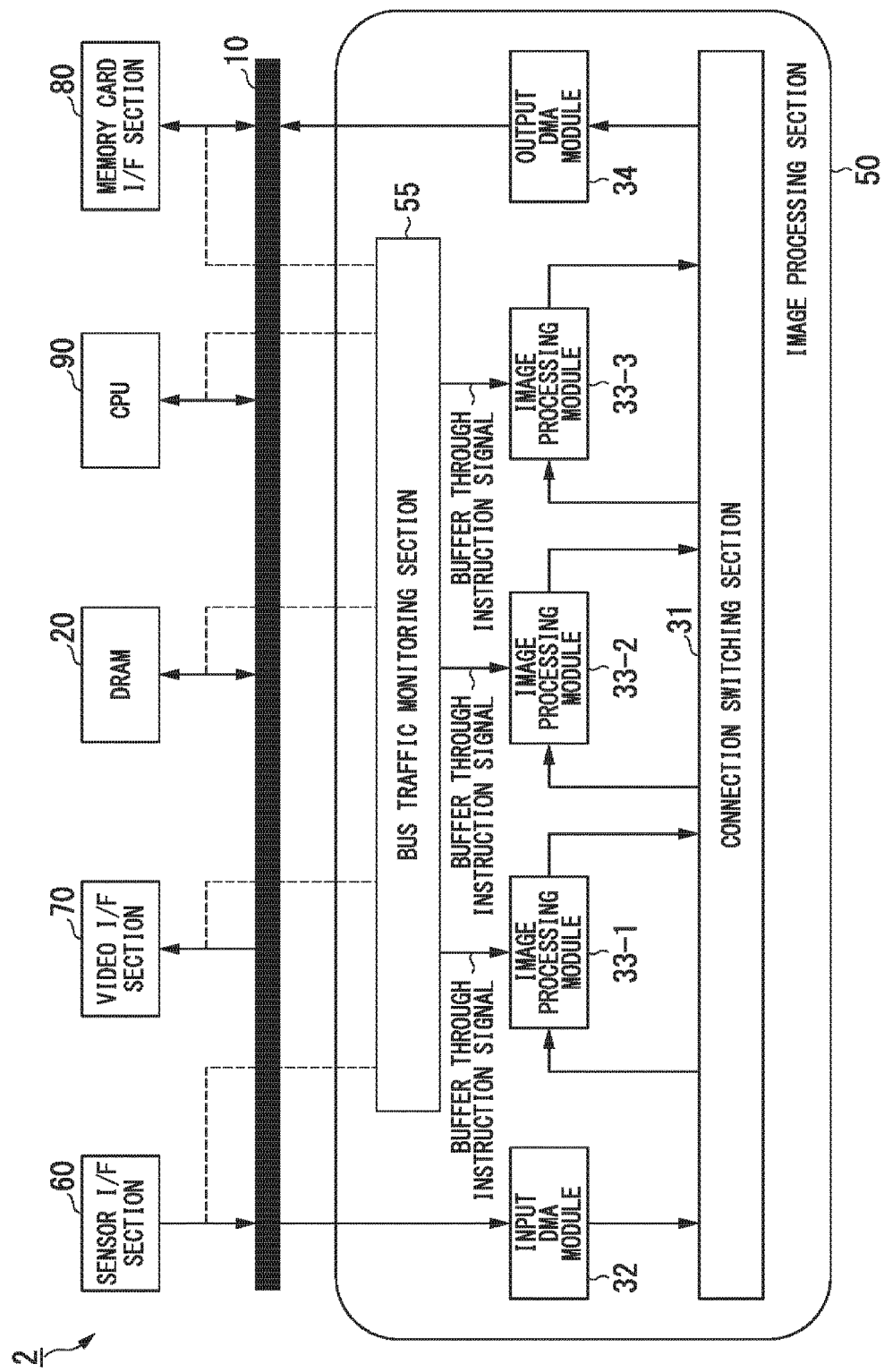
FIG. 11 is a block diagram showing a schematic configuration of an image processing device in a second embodiment of the present invention.

Next, an image processing device of the second embodiment of the present invention will be described. FIG. 11 is a block diagram showing a schematic configuration of the image processing device in the second embodiment of the present invention. An image processing device 2 shown in FIG. 11 includes the DMA bus 10, the DRAM 20, an image processing section 50, a sensor interface (I/F) section 60, a video interface (I/F) section 70, a memory card interface (I/F) section 80, and a CPU (central processing unit) 90. Further, the image processing section 50 includes the connection switching section 31, the input DMA module 32, three image processing modules 33-1 to 33-3, the output DMA module 34, and a bus traffic monitoring section 55. Similar to the image processing device 1, the image processing device 2 is also provided in an imaging device such as, for example, a still image camera.

The component elements of the image processing device 2 include the component elements similar to those of provided in the component elements the image processing device 1 of the first embodiment shown in FIG. 1. Accordingly, in the following description, in the component elements of the image processing device 2, the same reference signs are assigned to component elements similar to those of provided in the component elements the image processing device 1 of the first embodiment, and a detailed description related to each component element will be omitted.

The sensor interface section 60 is an imaging processing section that is connected to the DMA bus 10 and controls a solid-state imaging device (an image sensor) that photoelectrically converts an optical image of a subject formed by a lens provided in the imaging device. The sensor interface section 60 causes the DRAM 20 to store data of the still image of each frame captured by the image sensor via the DMA bus 10. In the image processing device 2, the data of a still image of one frame stored in the DRAM 20 by the sensor interface section 60 is divided into a plurality of predetermined small blocks, and the image processing section 50 performs image processing on each block.

The video interface section 70 is a display processing section that is connected to the DMA bus 10 and causes data of a display image stored in the DRAM 20 to be displayed on a display unit (not shown) provided in the imaging device by performing image processing in the image processing section 50. The video interface section 70 reads the data of the display image from the DRAM 20 via the DMA bus 10 and causes the display unit to display the read data of the display image.

The memory card interface section 80 is a record processing section that is connected to the DMA bus 10 and records image data for recording stored in the DRAM 20 by performing image processing in the image processing section 50 on a recording medium such a memory card connected to a configuration capable of being detached from the imaging device. The memory card interface section 80 reads the image data for recording from the DRAM 20 via the DMA bus 10 and records the read image data for recording on the recording medium.

The CPU 90 is a system control section that is connected to the DMA bus 10 and controls the component elements included in the image processing device 2 and the component elements provided in the imaging device. The CPU 90 reads programs and data for controlling the component elements via the DMA bus 10, and controls the entire imaging device in accordance with the read programs and data.

In the following description, when the sensor interface section 60, the video interface section 70, the memory card interface section 80, and the CPU 90 which are connected to the DMA bus 10 and access the DRAM 20 via the DMA bus 10 are indicated without distinction, they are referred to as a "bus master".

Similar to the image processing section 30 provided in the image processing device 1 of the first embodiment, the image processing section 50 divides the data of a still image of one frame stored in the DRAM 20 into a plurality of predetermined small blocks and performs image processing on each block. The image processing section 50 is also the bus master connected to the DMA bus 10. As shown in FIG. 11, the image processing section 50 sequentially performs image processing in the image processing device 2 according to the pipeline processing in which the input DMA module 32, the image processing module 33-1, the image processing module 33-2, the image processing module 33-3, and the output DMA module 34 are connected together in series.

Also, the image processing section 50 also includes component elements similar to the component elements of the image processing section 30 provided in the image processing device 1 of the first embodiment shown in FIG. 1. Accordingly, in the following description, only differences of the component elements of the image processing section 50 from the component elements of the image processing section 30 provided in the image processing device 1 of the first embodiment will be described, and the same reference signs are assigned to the component elements similar to those of the image processing section 30 provided in the image processing device 1 of the first embodiment, and a detailed description thereof will be omitted.

The connection switching section 31 performs switching of a connection between processing modules provided in the image processing section 50, in accordance with control from the CPU 90.

The bus traffic monitoring section 55 monitors the bus traffic of the DMA bus 10 by monitoring the access to the DRAM 20 by each bus master connected to the DMA bus 10 in the image processing section 50. Then, on the basis of the monitored bus traffic of the DMA bus 10, the bus traffic monitoring section 55 outputs an instruction signal (hereinafter referred to as a "buffer through instruction signal") for issuing an instruction for outputting input data to the arithmetic section 333 that is bypasses the input buffer 331, to each image processing module 33.

More specifically, the bus traffic monitoring section 55 monitors a DMA control signal when each bus master connected to the DMA bus 10 performs delivery (reading and writing) of data from and to the DRAM 20 via the DMA bus 10. This DMA control signal is, for example, a DMA request signal output when each bus master requests access to the DRAM 20 by DMA, a DMA acknowledge signal to be output to the bus master that permit an access request by a bus arbiter (not shown) for arbitrating access from each bus master to the DRAM 20 by DMA, or the like. The bus traffic monitoring section 55 outputs the buffer through instruction signal for issuing an instruction for outputting input data to the arithmetic section 333 bypasses the input buffer 331 if it is determined that the amount of data flowing through the DMA bus 10 is small on the basis of the monitored bus traffic of the DMA bus 10.

Also, if the monitored bus traffic of the DMA bus 10 satisfies a predetermined condition, the bus traffic monitoring section 55 determines that the amount of data flowing through the DMA bus 10 is small. The condition with which the bus traffic monitoring section 55 determines that the amount of data flowing through the DMA bus 10 is small is, for example, a condition such as an interval of the DMA request signal output from the bus master or whether or not the DMA request signal is output from the bus master. More specifically, the bus traffic monitoring section 55 determines that the amount of data flowing through the DMA bus 10 is small if the interval of the DMA request signal from each bus master, that is, an interval at which each bus master accesses the DRAM 20 via the DMA bus 10, is longer than a predetermined interval threshold value. Also, the bus traffic monitoring section 55 determines that the amount of data flowing through the DMA bus 10 is small if a period during which each bus master does not have access to the DRAM 20 by DMA is longer than the predetermined interval threshold value.

Each of the image processing modules 33 is a processing module having a configuration similar to that of the image processing module 33 provided in the image processing section 30 in the image processing device 1 of the first embodiment. However, in accordance with the buffer through instruction signal output by the bus traffic monitoring section 55, the image processing device 2 performs selection (switching) between whether to output the input data to the arithmetic section 333 bypasses the input buffer 331 and whether to output the input data to the arithmetic section 333 after being temporarily stored in the input buffer 331. In the configuration of the image processing module 33 shown in FIG. 5, by inputting the buffer through instruction signal output from the bus traffic monitoring section 55 instead of the pipeline stall signal input from the processing module of the subsequent stage, the buffer through determination section 3342 can perform an operation similar to that of the image processing section 30 provided in the image processing device 1 of the first embodiment. That is, the buffer through determination section 3342 can output a buffer through signal for controlling the selector 332 on the basis of the buffer through instruction signal.

Also, the pipeline stall signal is a signal indicating that an output of input data is not requested because the pipeline processing is (temporarily) stopped, and the buffer through instruction signal is a signal indicating an instruction for outputting the input data to the arithmetic section 333 bypasses the input buffer 331. That is, a meaning indicated by the pipeline stall signal and a meaning indicated by the buffer through instruction signal are opposite to each other. Accordingly, in the configuration of the image processing module 33 shown in FIG. 5, the buffer through determination section 3342 determines a method of controlling the input buffer 331 (that is, the input buffer writing management section 3343 and the input buffer reading management section 3344) and the selector 332 by inversely grasping the meaning of the buffer through instruction signal to be input instead of the pipeline stall signal.

Each image processing modules 33 performs control so that the input data input from the processing module of the previous stage bypasses the input buffer 331 and is transferred to the arithmetic section 333, if the buffer through instruction signal indicates an instruction for outputting the input data to the arithmetic section 333 that is bypasses the input buffer 331 and the storage capacity of the input buffer 331 is entirely free. At this time, each image processing module 33 reduces the power consumption of the input buffer 331 by stopping the operation of the input buffer 331.

Figure 12:
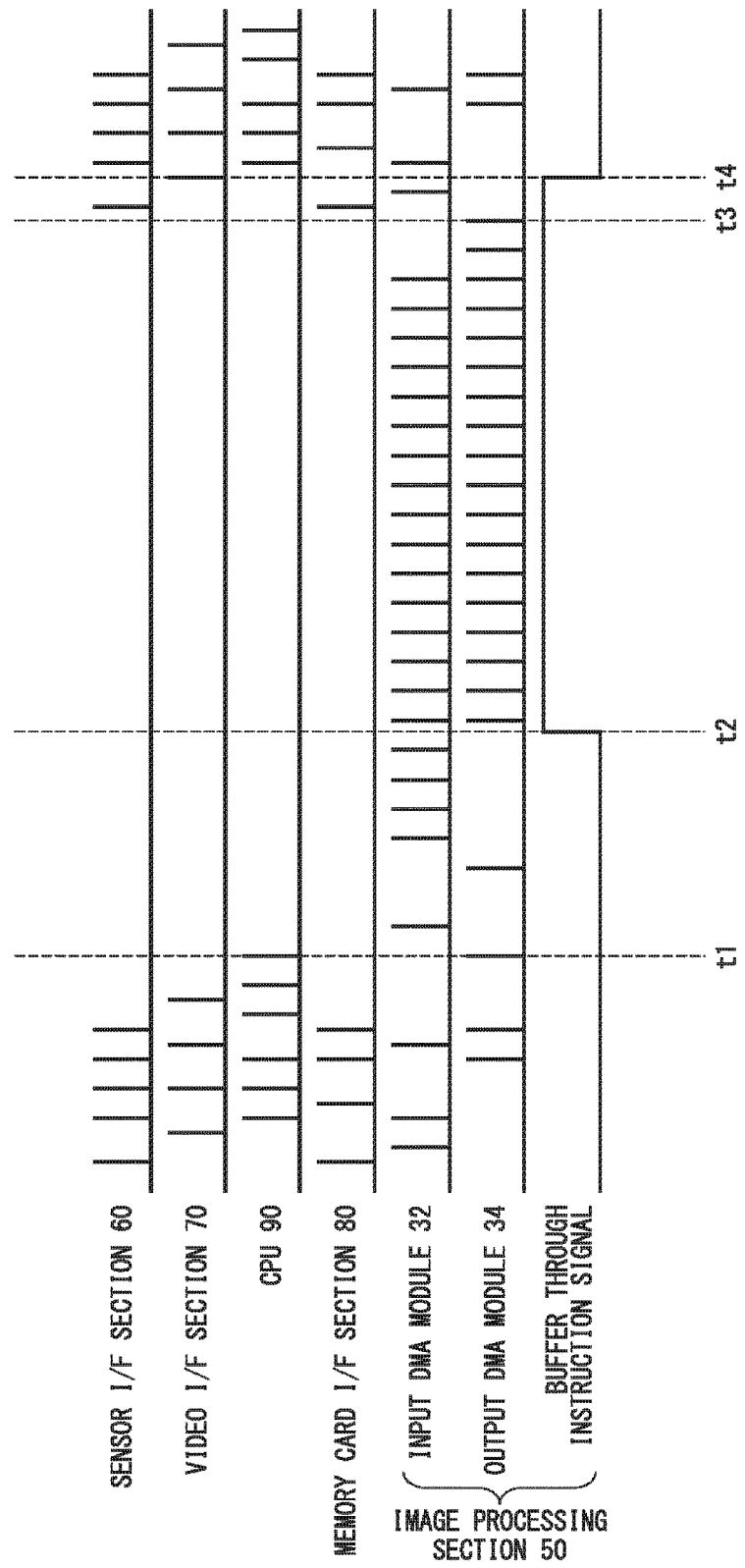
FIG. 12 is a timing chart showing an example of an operation of a bus traffic monitoring section in an image processing section provided in the image processing device of the second embodiment of the present invention.

Next, an operation of monitoring the bus traffic of the DMA bus 10 in the bus traffic monitoring section 55 will be described. FIG. 12 is a timing chart showing an example of the operation of the bus traffic monitoring section 55 in the image processing section 50 provided in the image processing device 2 of the second embodiment of the present invention. In FIG. 12, an example of a DMA request signal output when each bus master provided in the image processing device 2 requests access to the DRAM 20 and a DMA request signal output when the input DMA module 32 and the output DMA module 34 provided in the image processing section 50 request access to the DRAM 20 is shown. Also, in FIG. 12, an example of the buffer through instruction signal output by the bus traffic monitoring section 55 in accordance with the result of monitoring the bus traffic of the DMA bus 10 is also shown.

Each bus master provided in the image processing device 2 outputs an access request (the DMA request signal) for the DRAM 20 by DMA to a bus arbiter (not shown) in accordance with a processing state. The bus arbiter (not shown) arbitrates the DMA request signal input from each bus master and outputs a DMA acknowledge signal to the bus master that permits the access request. Thereby, the bus master to which the DMA acknowledge signal is input, that is, the bus master for which the access request is permitted, accesses the DRAM 20 by DMA. Here, access of each bus master to the DRAM 20 is not performed at regular intervals as shown in FIG. 12.

The bus traffic monitoring section 55 monitors bus traffic of the DMA bus 10 by monitoring access to the DRAM 20 by DMA performed by a bus master other than the image processing section 50. More specifically, the bus traffic monitoring section 55 measures the interval of the DMA request signal output from each bus master other than the image processing section 50 for each bus master. Thereby, the bus traffic monitoring section 55 can determine the state of the bus traffic of the DMA bus 10. For example, if the DMA request signal is output from one bus master at intervals shorter than a predetermined interval threshold value, a ratio of occupation of the DMA bus 10 by this bus master is high, and access to the DRAM 20 is frequently performed, so that it can be determined that much data flows through the DMA bus 10. Also, for example, if the interval of the DMA request signals output from each bus master is longer than the predetermined interval threshold value, but DMA request signals are output from a plurality of bus masters at the same time, the occupation rate of the DMA bus 10 by each bus master is low but the DRAM 20 is frequently accessed by a plurality of bus masters, so that it can be determined that much data flows through the DMA bus 10.

As described above, when much data is flowing through the DMA bus 10, even when the image processing section 50 requests access to the DRAM 20 by DMA, a case in which the interval at which the access request is permitted is lengthened and pipeline processing in the image processing section 50 is delayed, that is, the pipeline stall state occurs, is assumed. Thus, the bus traffic monitoring section 55 does not output the buffer through instruction signal indicating an instruction for outputting the input data to the arithmetic section 333 bypasses the input buffer 331. In the timing chart shown in FIG. 12, an instruction for outputting the input data to the arithmetic section 333 bypasses the input buffer 331 is not to be indicated, by setting the buffer through instruction signal to the "Low" level. Thereby, in each image processing module 33 provided in the image processing section 50, the buffer through determination section 3342 performs control so that the input data is read and transferred to the arithmetic section 333 after being temporarily stored in the input buffer 331. Then, in each image processing module 33, pipeline processing is performed by sequentially outputting the processed pixel data generated by performing an arithmetic operation of image processing in the arithmetic section 333 to the processing module of the subsequent stages.

Also, if the DMA request signal output from the bus master other than the image processing section 50 is absent, that is, the bus master other than the image processing section 50 does not have access to the DRAM 20, and this state continues longer than a predetermined period as after a timing t1 in the timing chart shown in FIG. 12, the bus traffic monitoring section 55 determines that the amount of data flowing through the DMA bus 10 is small. Then, the bus traffic monitoring section 55 outputs the buffer through instruction signal indicating an instruction for outputting the input data to the arithmetic section 333 bypasses the input buffer 331. In the timing chart shown in FIG. 12, an instruction for outputting the input data to the arithmetic section 333 bypasses the input buffer 331 is indicated by setting the buffer through instruction signal to the "High" level from a timing t2. Thereby, in each image processing module 33 provided in the image processing section 50, the buffer through determination section 3342 controls the selector 332 so that the input data bypasses the input buffer 331, and is output to the arithmetic section 333 and stops the operation of the input buffer 331 to reduce the power consumption of the input buffer 331. Then, in each image processing module 33, pipeline processing is processing by sequentially outputting the processed pixel data generated by the arithmetic section 333 performing the arithmetic operation of image processing on the input data transferred that is bypasses the input buffer 331 to the processing module of the subsequent stage.

Also, if a DMA request signal is output from a bus master other than the image processing section 50, that is, access to the DRAM 20 by a bus master other than the image processing section 50 is performed as after a timing t3 in the timing chart shown in FIG. 12, the bus traffic monitoring section 55 determines that the data flowing to the DMA bus 10 will increase from now on. Thus, the bus traffic monitoring section 55 indicates that an instruction for outputting the input data to the arithmetic section 333 bypasses the input buffer 331 is not indicated by setting the buffer through instruction signal to the "Low" level again from a timing t4. Thereby, in each image processing module 33 provided in the image processing section 50, the buffer through determination section 3342 performs control so that input data is read and transferred to the arithmetic section 333 after being temporarily stored in the input buffer 331.

In this manner, the bus traffic monitoring section 55 monitors the bus traffic of the DMA bus 10 on the basis of access to the DRAM 20 by each bus master connected to the DMA bus 10. Then, on the basis of the monitored bus traffic of the DMA bus 10, the bus traffic monitoring section 55 outputs the buffer through instruction signal for controlling whether or not to transfer input data bypasses the input buffer 331 to the arithmetic section 333 to each image processing module 33 constituting the pipeline in the image processing section 50.

The conditions used to determine the bus traffic in the bus traffic monitoring section 55, that is, the conditions used to determine whether the data flowing through the DMA bus 10 is large or small, is not limited to the interval of the DMA request signal output from each bus master or the condition of whether or not the DMA request signal is output from the bus master, as described above, and may be determined according to other conditions. For example, the bus traffic may be determined according to the number of bus masters that access the DRAM 20. In this case, the bus traffic monitoring section 55 determines that the amount of data flowing through the DMA bus 10 is small if the number of bus masters that access the DRAM 20 is smaller than the predetermined number of threshold values, and determines that the amount of data flowing through the DMA bus 10 is large if the number of bus masters that access the DRAM 20 is larger than or equal to the predetermined number of threshold values. Also, for example, the bus traffic may be determined according to the time from the output of the DMA request signal by each bus master to the input of the DMA acknowledge signal. In this case, the bus traffic monitoring section 55 determines that the amount of data flowing through the DMA bus 10 is small when the time from the output of the DMA request signal to the input of the DMA acknowledge signal is shorter than a predetermined time threshold value, and determines that the amount of data flowing through the DMA bus 10 is large when the time from the output of the DMA request signal to the input of the DMA acknowledge signal is greater than or equal to the predetermined time threshold value.

According to the second embodiment, an image processing device (the image processing device 2) in which the image processing section (the image processing section 50) further includes a bus traffic monitoring section (the bus traffic monitoring section 55) configured to monitor bus traffic in the data bus (the DMA bus 10) by monitoring access of a plurality of bus masters (the sensor interface section 60, the video interface section 70, the memory card interface section 80, the CPU 90, and the like) connected to the DMA bus 10 to the memory (the DRAM 20), the bus traffic monitoring section 55 outputs a buffer through instruction signal indicating selection of a path along which the data (the pixel data or the processed pixel data) is transferred (to the arithmetic section 333) by bypassing the data buffer (the input buffer 331) to each processing module (the image processing module 33) if it is determined that the amount of data flowing through the DMA bus 10 is small on the basis of the monitored bus traffic, and the control section (the control section 334) within each image processing module 33 determines that the pixel data or processed pixel data flow in the pipeline processing is not in a delayed state if the buffer through instruction signal is input is configured.

As described above, in the image processing device 2 of the second embodiment, the bus traffic monitoring section 55 provided in the image processing section 50 monitors the bus traffic in the DMA bus 10 by monitoring the access of another bus master provided in the image processing device 2 to the DRAM 20. Then, the image processing device 2 of the second embodiment controls whether or not to transfer the input data input to each image processing module 33 constituting the pipeline provided in the image processing section 50 to the arithmetic section 333 bypasses the input buffer 331 on the basis of the bus traffic monitored by the bus traffic monitoring section 55. At this time, each image processing module 33 stops the operation of the input buffer 331 when the input data input bypasses the input buffer 331 is transferred to the arithmetic section 333. Thereby, each image processing module 33 can reduce power consumption in the input buffer 331. Thus, in the image processing device 2 of the second embodiment, as in the image processing device 1 of the first embodiment, it is possible to reduce power consumption in the pipeline processing without deteriorating the performance of the pipeline processing when desired image processing is performed according to the pipeline processing by each image processing module 33 provided in the image processing section 50.

Also, in the image processing device 2 of the second embodiment, a configuration in which the image processing module 33 selects (switches) whether to output the input data to the arithmetic section 333 bypasses the input buffer 331 or whether to output the input data to the arithmetic section 333 after being temporarily stored in the input buffer 331 in accordance with the buffer through instructing signal output on the basis of the bus traffic of the DMA bus 10 monitored by the bus traffic monitoring section 55 provided in the image processing section 50 has been described. However, each image processing module 33 may have a configuration in which it is determined whether or not to cause the data to bypass the input buffer 331 with the operation state of the image processing module 33 of the subsequent stage (including a plurality of subsequent stages) as in the image processing device 1 of the first embodiment in addition to the buffer through instruction signal. In this case, the buffer through determination section 3342 in each image processing module 33 provided in the image processing section 50 can control the input buffer writing management section 3343, the input buffer reading management section 3344, and the selector 332 on the basis of the buffer through instructing signal and the operation state of the processing module connected to the subsequent stage. As in the image processing device 1 of the first embodiment, it is also possible to intentionally perform control so that the input data bypasses the input buffer 331 and is transferred to the arithmetic section 333.

Also, in the image processing device 2 of the second embodiment, the configuration in which the bus traffic monitoring section 55 is provided in the image processing section 50 has been described. However, the bus traffic monitoring section 55 may be provided outside the image processing section 50. For example, a bus arbiter (not shown) provided in the image processing device 2 may have a function of monitoring the bus traffic of the DMA bus 10 as in the bus traffic monitoring section 55. In this case, it is possible to adopt a configuration in which the buffer through determination section 3342 in each image processing module 33 provided in the image processing section 50 determines whether or not to cause the data to bypass the input buffer 331 on the basis of a signal indicating the state of bus traffic of the DMA bus 10 monitored by a bus arbiter (not shown), and control the input buffer writing management section 3343, the input buffer reading management section 3344, and the selector 332. As in the image processing device 1 of the first embodiment, it is also possible to intentionally perform control so that the input data bypasses the input buffer 331 and is transferred to the arithmetic section 333.

Also, in the image processing device 2 of the second embodiment, a case in which each processing module constituting a pipeline included in the image processing section 50 is a processing module having a configuration similar to that of the image processing module 33 of the first configuration provided in the image processing section 30 in the image processing device 1 of the first embodiment has been described. However, each processing module constituting the pipeline provided in the image processing section 50 is not limited to the image processing module 33 of the first configuration and may be the image processing module 43 of the second configuration. Even when each processing module constituting the pipeline included in the image processing section 50 is the image processing module 43 of the second configuration, operations of the image processing device 2 and the image processing section 50 of the second embodiment can be considered to be similar to the above-described operations. Accordingly, a detailed description of the operation in the case in which each processing module constituting the pipeline provided in the image processing section 50 is the image processing module 43 of the second configuration will be omitted.

As described above, according to each embodiment of the present invention, a configuration in which it is selected (switched) whether or not to cause the data to bypass the data buffer provided in the processing module itself is provided in each processing module constituting the pipeline in the image processing section. In each embodiment of the present invention, the selection (switching) of whether or not to cause the data to bypass the data buffer provided in the processing module itself is controlled on the basis of the state of there being free storage capacity in the data buffer provided in the processing module itself and the operation state of the processing module connected to the subsequent stage (including a plurality of subsequent stages). In the embodiments of the present invention, the image processing section monitors the bus traffic of the connected DMA bus and controls the selection (switching) of whether or not to cause the data to bypass the data buffer provided in the processing module itself on the basis of the monitored bus traffic. At this time, in each embodiment of the present invention, it is possible to intentionally control an input data request for the processing module connected to the previous stage in the pipeline configuration on the basis of the state of there being free storage capacity in the data buffer provided in the processing module itself. In each embodiment of the present invention, control is performed so that the operation of the data buffer is stopped if control is performed so that the data bypasses the data buffer in each processing module. Thereby, in each embodiment of the present invention, it is possible to reduce the power consumption in the data buffer provided in the processing module itself when an arithmetic operation of image processing is performed in each processing module. Thereby, in each embodiment of the present invention, it is possible to reduce power consumption in the pipeline processing without deteriorating the performance of the pipeline processing when desired image processing is performed according to the pipeline processing by each image processing module provided in the image processing section.

In each of the embodiments of the present invention, a configuration in which a function of controlling the selection (switching) of whether or not to cause the data to bypass the data buffer provided in the image processing module itself is provided in each image processing module constituting the pipeline in the image processing section provided in the image processing device has been described. However, as described above, the data buffer is also provided in the input DMA module and the output DMA module which are processing modules constituting the pipeline in the image processing section. Accordingly, similar to the image processing module, the input DMA module and the output DMA module may also have a function of controlling the selection (switching) of whether or not to cause the data to bypass data buffers provided itself. By providing this function, advantageous effects similar to those of the image processing module can be obtained in the input DMA module and the output DMA module.

Also, in each embodiment of the present invention, the configuration in which each processing module constituting the pipeline is provided in the image processing section provided in the image processing device has been described. However, various processing devices other than the image processing device are conceivable as the processing device that performs a series of processes according to the pipeline configuration. Accordingly, the processing device to which the concept of the present invention can be applied is not limited to the image processing device shown in each embodiment of the present invention, and it is possible to similarly apply the concept of the present invention and obtain advantageous effects similar to those of the present invention as long as any processing device for performing the pipeline processing by connecting a plurality of processing modules in series to configure the pipeline is provided.

While preferred embodiments of the present invention have been described and shown above, the invention is not limited to the embodiments and modified examples thereof. Within a range not departing from the gist or spirit of the present invention, additions, omissions, substitutions, and other modifications to the configuration can be made.

Also, the present invention is not to be considered as being limited by the foregoing description, and is limited only by the scope of the appended claims.

What is claimed is:

1. An image processing device includes a memory and an image processing section, the memory and the image processing section being connected to a data bus, the image processing section including a pipeline in which a plurality of processing modules is connected in series, each processing modules being configured to perform a predetermined process on input data, and the image processing section performing pipeline processing by the processing modules sequentially performing the process,
wherein each of the processing modules includes:
a data buffer configured to temporarily store the data in unit of processing; and
a control section configured to determine whether or not to store the data in the data buffer on the basis of a state of a data flow in the pipeline processing and a state of the data stored in the data buffer, and to select a path within the processing module by which the data is transferred on the basis of a determination result, and to control an operation of the data buffer,
wherein the control section selects a path for reading and transferring the data after the data is temporarily stored in the data buffer and causes the data buffer to operate if the data is able to be further stored in the data buffer in a state in which the data is stored in a storage capacity of the data buffer,
wherein the control section selects a path for reading and transferring the data after the data is temporarily stored in the data buffer and causes the data buffer to operate so that the stored data is held if the data is unable to be further stored in the data buffer in a state in which the data flow in the pipeline processing is delayed,
wherein the control section selects a path along which the data is transferred by bypassing the data buffer without being stored in the data buffer and causes an operation of the data buffer to stop if the data is not stored in all the storage capacity of the data buffer in a state in which the data flow in the pipeline processing is not delayed,
wherein the control section outputs a state notification signal indicating an operation state of the processing module provided with the control section itself to the processing module of a previous stage in the configuration of the pipeline, and
wherein the control section determines a state of the data flow in the pipeline processing on the basis of the state notification signal input from the processing module of a subsequent stage in the configuration of the pipeline.

2. The image processing device according to claim 1,
wherein the control section determines the state of the data flow in the pipeline processing on the basis of the state notification signals input from a plurality of the processing modules of the subsequent stages in the configuration of the pipeline.

3. The image processing device according to claim 1,
wherein the state notification signal is a signal indicating whether or not it is possible to receive the data on which the processing module of the previous stage has performed the process,
wherein the state notification signal includes a data request signal for requesting an output of the data on which the processing module of the previous stage has performed the process, and
wherein the control section determines that the data flow in the pipeline processing is not delayed if the data request signal for requesting an output of the data from the processing module of the subsequent stage is input.

4. The image processing device according to claim 3,
wherein the control section outputs the data request signal for requesting the output of the data to the processing module of the previous stage if the data is able to be stored in the data buffer.

5. The image processing device according to claim 3,
wherein the control section defers an output of the data request signal for requesting the output of the data to the processing module of the previous stage until a state in which the data is not stored in all the storage capacity of the data buffer is reached, and
wherein, after the state in which the data is not stored in all the storage capacity of the data buffer is reached, the control section outputs the data request signal to the processing module of the previous stage, selects the path along which the data is transferred by bypassing the data buffer, and causes the operation of the data buffer to stop.

6. The image processing device according to claim 1,
wherein the image processing section further includes a bus traffic monitoring section configured to monitor bus traffic in the data bus by monitoring access of a plurality of bus masters connected to the data bus to the memory,
wherein the bus traffic monitoring section outputs a buffer through instruction signal indicating selection of a path along which the data is transferred by bypassing the data buffer to each processing module if it is determined that an amount of data flowing through the data bus is small on the basis of the monitored bus traffic, and
wherein the control section within each processing module determines that the data flow in the pipeline processing is not in a delayed state if the buffer through instruction signal is input.

7. The image processing device according to claim 1,
wherein the processing module further includes a selector configured to select either one of the path along which the data read from the data buffer is transferred and the path along which the data is transferred by bypassing the data buffer as the path along which the data is transferred, wherein the control section includes a data amount management section configured to manage an amount of data stored in the data buffer and output data amount information indicating the monitored amount of data;

a buffer through determination section configured to determine an operation to be performed in the data buffer on the basis of the data amount information and the state of the data flow in the pipeline processing and output an instruction signal instructing the data buffer to write the data and read the data from the data buffer and a control signal for selecting the path along which the data is transferred on the basis of a determination result;

a buffer writing management section configured to generate a buffer writing signal which is a control signal for controlling writing of the data to the data buffer in accordance with the instruction signal for writing the data to the data buffer; and a buffer reading management section configured to generate a buffer reading signal which is a control signal for controlling reading of the data from the data buffer in accordance with the instruction signal for reading the data from the data buffer, wherein the data amount management section manages the amount of data on the basis of a number of input data and the buffer reading signal, wherein the buffer through determination section outputs the instruction signal for issuing an instruction for performing the writing of the data to the data buffer and the reading of the data from the data buffer, and the control signal for selecting a path for reading and transferring the data after being the data is temporarily stored in the data buffer if the data amount information indicates that the amount of data is a value greater than 0, wherein the buffer through determination section outputs the instruction signal for issuing an instruction for stopping the writing of the data to the data buffer and the reading of the data from the data buffer, and the control signal for selecting a path along which the data is transferred by bypassing the data buffer if the data amount information indicates that the amount of data is 0, and wherein the selector selects a path according to the control signal as the path along which the data is transferred.

8. An image processing method in an image processing device includes a memory and an image processing section, the memory and the image processing section being connected to a data bus, the image processing section including a pipeline in which a plurality of processing modules is connected in series, each processing modules being configured to perform a predetermined process on input data, and the image processing section performing pipeline processing by the processing modules sequentially performing the process, the image processing method comprising:

a control step, by each of the processing modules, determining whether or not to store the data in a data buffer on the basis of a state of a data flow in the pipeline processing and a state of the data stored in the data buffer temporarily storing the data in unit of processing, and selecting a path within the processing module by which the data is transferred on the basis of a determination result, and to controlling an operation of the data buffer, wherein the control step selecting a path for reading and transferring the data after the data is temporarily stored in the data buffer and causes the data buffer to operate if the data is able to be further stored in the data buffer in a state in which the data is stored in a storage capacity of the data buffer, wherein the control step selecting a path for reading and transferring the data after the data is temporarily stored in the data buffer and causes the data buffer to operate so that the stored data is held if the data is unable to be further stored in the data buffer in a state in which the data flow in the pipeline processing is delayed, wherein the control step selecting a path along which the data is transferred by bypassing the data buffer without being stored in the data buffer and causes an operation of the data buffer to stop if the data is not stored in all the storage capacity of the data buffer in a state in which the data flow in the pipeline processing is not delayed, wherein the control step outputting a state notification signal indicating an operation state of the processing module executing the control step itself to the processing module of a previous stage in the configuration of the pipeline, and wherein the control step determining a state of the data flow in the pipeline processing on the basis of the state notification signal input from the processing module of a subsequent stage in the configuration of the pipeline.

* * * * *